United States Patent
Kobayashi

(10) Patent No.: US 7,525,690 B2
(45) Date of Patent: Apr. 28, 2009

(54) IMAGE PROCESSING DEVICE, IMAGE PROCESSING METHOD, AND IMAGE PROCESSING PROGRAM

(75) Inventor: Makoto Kobayashi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 560 days.

(21) Appl. No.: 11/180,915

(22) Filed: Jul. 14, 2005

(65) Prior Publication Data

US 2006/0028688 A1     Feb. 9, 2006

(30) Foreign Application Priority Data

Jul. 15, 2004  (JP)  ............... 2004-209031

(51) Int. Cl.
*H04N 1/40* (2006.01)
(52) U.S. Cl. ............... 358/3.23; 358/1.9
(58) Field of Classification Search ........ 358/3.23, 358/3.01, 1.9, 1.1
See application file for complete search history.

(56) References Cited

U.S. PATENT DOCUMENTS 6,519,056 B1 * 2/2003 Hattori ............... 358/3.09
6,791,715 B1 * 9/2004 Fujita ............... 358/1.9

FOREIGN PATENT DOCUMENTS

| JP | 2000-4359 A | 1/2000 |
|---|---|---|
| JP | 2000-85187 A | 3/2000 |
| JP | 2000-228728 A | 8/2000 |
| JP | 2002-330287 A | 11/2002 |
| JP | 2003-162717 | 6/2003 |

* cited by examiner

*Primary Examiner*—Thomas D Lee
*Assistant Examiner*—Stephen M Brinich
(74) *Attorney, Agent, or Firm*—Sughrue Mion, PLLC

(57) ABSTRACT

The image processor has a halftone processing unit which converts the grayscale input data of pixels into image regeneration output data corresponding to a dot size of pixels, and a lookup table including a plurality of gamma tables storing image regeneration output data corresponding to the grayscale input data, corresponding to the position of the pixels of the grayscale input data. In the lookup table, a virtual representative gamma table is allocated to each identical index pixel group disposed on a predetermined displacement vector, each virtual representative gamma table is further composed of a plurality of diffusion gamma tables which are dispersed on a plane within the corresponding identical index pixel group, and the plurality of diffusion gamma tables have one of discrete image regeneration output data near the output grayscale value of the representative gamma table according to the grayscale input data.

9 Claims, 27 Drawing Sheets

FIG.3
INPUT GRAYSCALE VALUE 10
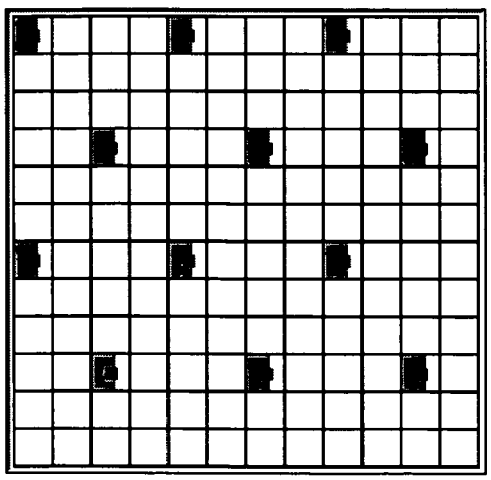
INPUT GRAYSCALE VALUE 40
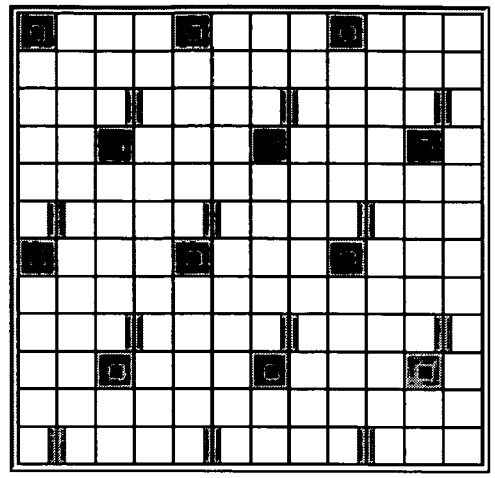
INPUT GRAYSCALE VALUE 90
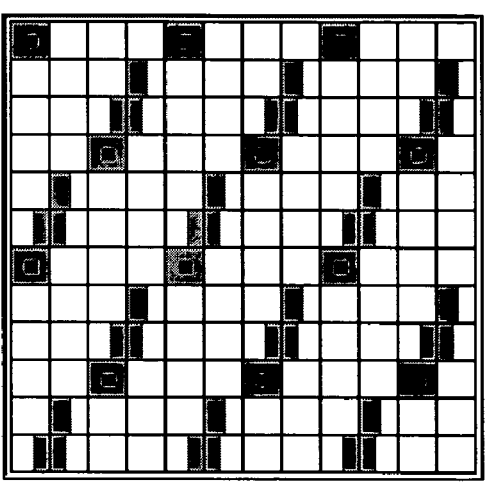
INPUT GRAYSCALE VALUE 150
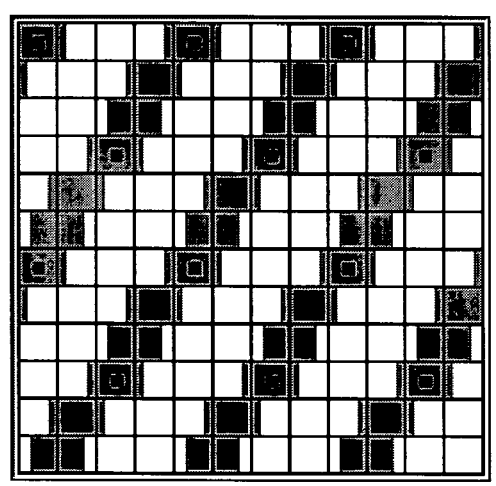
INPUT GRAYSCALE VALUE 220
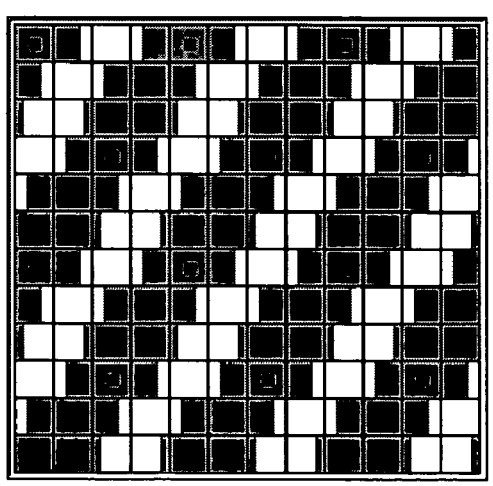
INPUT GRAYSCALE VALUE 250
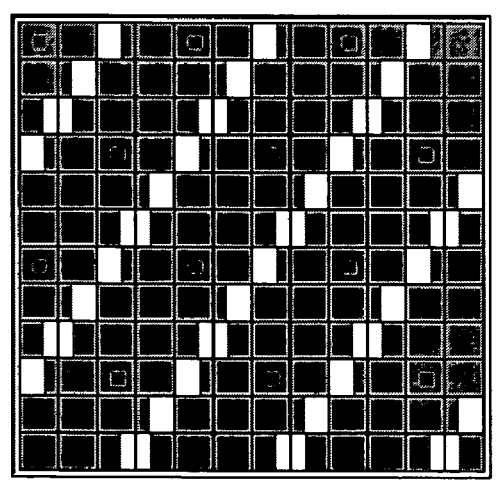

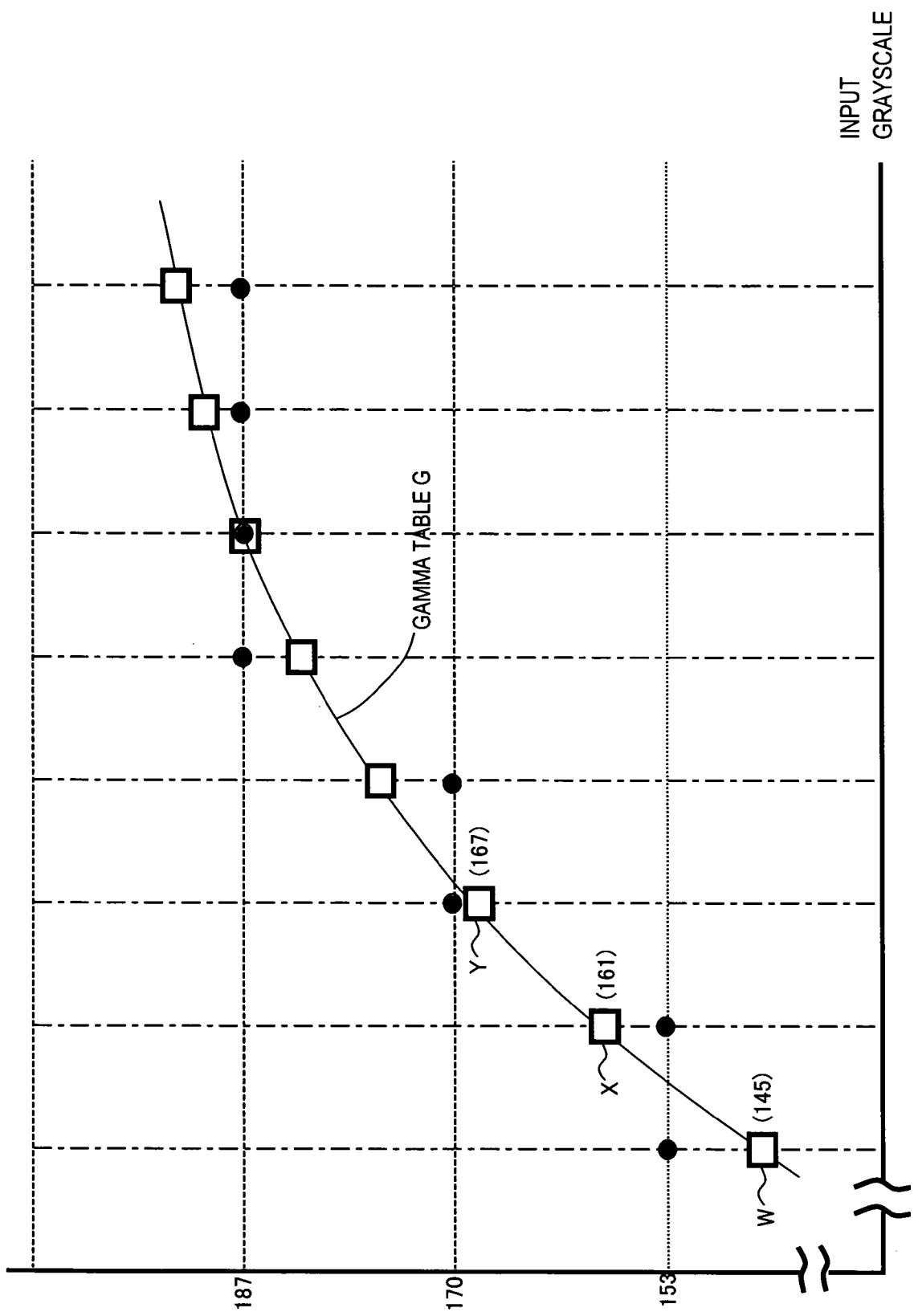

FIG.8

INDEX TABLE 120

| | 4 | | | | | | | | | | | | | | |
|---|---|---|---|---|---|---|---|---|---|---|---|---|---|---|---|
| ⓞ | 6 | 11 | 7 | ⓞ | 6 | 11 | 7 | ⓞ | 6 | 11 | 7 | ⓞ | 6 | 11 | 7 |
| 6 | 10 | 7 | 4 | 6 | 10 | 7 | 4 | 6 | 10 | 7 | 4 | 6 | 10 | 7 | 4 |
| 8 | 9 | 3 | 2 | 8 | 9 | 3 | 2 | 8 | 9 | 3 | 2 | 8 | 9 | 3 | 2 |
| 11 | 7 | ⓞ | 6 | 11 | 7 | ⓞ | 6 | 11 | 7 | ⓞ | 6 | 11 | 7 | ⓞ | 6 |
| 7 | 4 | 6 | 10 | 7 | 4 | 6 | 10 | 7 | 4 | 6 | 10 | 7 | 4 | 6 | 10 |
| 3 | 2 | 8 | 9 | 3 | 2 | 8 | 9 | 3 | 2 | 8 | 9 | 3 | 2 | 8 | 9 |
| ⓞ | 6 | 11 | 7 | ⓞ | 6 | 11 | 7 | ⓞ | 6 | 11 | 7 | ⓞ | 6 | 11 | 7 |
| 6 | 10 | 7 | 4 | 6 | 10 | 7 | 4 | 6 | 10 | 7 | 4 | 6 | 10 | 7 | 4 |
| 8 | 9 | 3 | 2 | 8 | 9 | 3 | 2 | 8 | 9 | 3 | 2 | 8 | 9 | 3 | 2 |
| 11 | 7 | ⓞ | 6 | 11 | 7 | ⓞ | 6 | 11 | 7 | ⓞ | 6 | 11 | 7 | ⓞ | 6 |
| 7 | 4 | 6 | 10 | 7 | 4 | 6 | 10 | 7 | 4 | 6 | 10 | 7 | 4 | 6 | 10 |
| 3 | 2 | 8 | 9 | 3 | 2 | 8 | 9 | 3 | 2 | 8 | 9 | 3 | 2 | 8 | 9 |
| ⓞ | 6 | 11 | 7 | ⓞ | 6 | 11 | 7 | ⓞ | 6 | 11 | 7 | ⓞ | 6 | 11 | 7 |
| 6 | 10 | 7 | 4 | 6 | 10 | 7 | 4 | 6 | 10 | 7 | 4 | 6 | 10 | 7 | 4 |
| 8 | 9 | 3 | 2 | 8 | 9 | 3 | 2 | 8 | 9 | 3 | 2 | 8 | 9 | 3 | 2 |
| 11 | 7 | ⓞ | 6 | 11 | 7 | ⓞ | 6 | 11 | 7 | ⓞ | 6 | 11 | 7 | ⓞ | 6 |
| 7 | 4 | 6 | 10 | 7 | 4 | 6 | 10 | 7 | 4 | 6 | 10 | 7 | 4 | 6 | 10 |
| 3 | 2 | 8 | 9 | 3 | 2 | 8 | 9 | 3 | 2 | 8 | 9 | 3 | 2 | 8 | 9 |

CORRESPONDENCE TABLE 121A

| FIG. 2 | FIG. 8 |
|---|---|
| 1 | 0 |
| 2 | 2, 3 |
| 3 | 4 |
| 4 | 6, 7 |
| 5 | 8, 9 |
| 6 | 10, 11 |
| | LEFT RIGHT |

FIG.9

INDEX TABLE 120A

| 36 | 90 | 59 | 79 | 12 | 66 | 83 | 67 | 48 | 54 | 23 | 91 | 36 | 30 | 95 | 31 |
|----|----|----|----|----|----|----|----|----|----|----|----|----|----|----|----|
| 42 | 46 | 79 | 64 | 78 | 106 | 7 | 64 | 6 | 70 | 79 | 88 | 6 | 94 | 55 | 16 |
| 80 | 93 | 3 | 62 | 56 | 93 | 51 | 50 | 32 | 81 | 99 | 2 | 56 | 21 | 51 | 14 |
| 23 | 19 | 84 | 66 | 95 | 43 | 60 | 66 | 11 | 19 | 96 | 102 | 71 | 7 | 36 | 102 |
| 19 | 4 | 30 | 106 | 19 | 28 | 18 | 58 | 67 | 76 | 90 | 70 | 7 | 28 | 54 | 22 |
| 75 | 50 | 32 | 45 | 15 | 98 | 32 | 9 | 3 | 38 | 68 | 33 | 3 | 74 | 32 | 9 |
| 36 | 30 | 11 | 43 | 84 | 42 | 95 | 79 | 60 | 90 | 95 | 79 | 24 | 66 | 47 | 67 |
| 78 | 94 | 55 | 40 | 30 | 22 | 79 | 40 | 102 | 82 | 19 | 88 | 102 | 82 | 7 | 64 |
| 104 | 45 | 15 | 14 | 56 | 93 | 27 | 26 | 80 | 105 | 63 | 2 | 44 | 33 | 87 | 2 |
| 35 | 19 | 24 | 54 | 59 | 55 | 60 | 30 | 59 | 19 | 24 | 30 | 83 | 31 | 36 | 30 |
| 103 | 76 | 18 | 22 | 55 | 4 | 54 | 58 | 91 | 76 | 102 | 34 | 79 | 40 | 42 | 106 |
| 51 | 38 | 32 | 21 | 87 | 38 | 44 | 33 | 99 | 74 | 44 | 9 | 51 | 26 | 32 | 93 |
| 0 | 54 | 59 | 91 | 96 | 42 | 35 | 79 | 48 | 30 | 107 | 43 | 84 | 78 | 71 | 43 |
| 102 | 34 | 91 | 52 | 66 | 106 | 79 | 76 | 30 | 94 | 103 | 76 | 78 | 58 | 31 | 64 |
| 44 | 21 | 3 | 2 | 44 | 81 | 75 | 2 | 92 | 57 | 75 | 74 | 56 | 81 | 39 | 62 |
| 23 | 31 | 72 | 42 | 35 | 31 | 96 | 54 | 23 | 103 | 12 | 78 | 59 | 79 | 96 | 102 |
| 55 | 4 | 54 | 10 | 31 | 76 | 102 | 46 | 7 | 40 | 6 | 70 | 7 | 52 | 90 | 22 |
| 27 | 38 | 104 | 81 | 39 | 2 | 56 | 105 | 87 | 14 | 44 | 33 | 75 | 26 | 32 | 81 |

CORRESPONDENCE TABLE 121B

| FIG. 2 | FIG. 8 | DIFFUSION $\gamma$ TABLE IN FIG. 9 (DISPERSED TO 9 TYPES OR 8 TYPES) |
|---|---|---|
| 1 | 0 | 0, 12, 24, 36, 48, 60, 72, 84, 96 |
| 2 | 2 | 2, 14, 26, 38, 50, 62, 74, 86, 98 |
|  | 3 | 3, 15, 27, 39, 51, 63, 75, 87 |
| 3 | 4 | 4, 16, 28, 40, 52, 64, 76, 88, 100 |
| 4 | 6 | 6, 18, 30, 42, 54, 66, 78, 90, 102 |
|  | 7 | 7, 19, 31, 43, 55, 67, 79, 91, 103 |
| 5 | 8 | 8, 20, 32, 44, 56, 68, 80, 92, 104 |
|  | 9 | 9, 21, 33, 45, 57, 69, 81, 93, 105 |
| 6 | 10 | 10, 22, 34, 46, 58, 70, 82, 94, 106 |
|  | 11 | 11, 23, 35, 47, 59, 71, 83, 95, 107 |

24 : 153 × 13 : 170 × 10
(13 : 10 ≃ 5 : 4)

120. INDEX TABLE

124. GAMMA TABLE 0

120A. INDEX TABLE

124. GAMMA TABLES (0, 12, 24, 36, 48, 60, 72, 84, 96)

| 36 | 90 | 59 | 79 | 12 | 66 | 83 | 67 | 48 | 54 | 23 | 91 | 36 | 30 | 95 | 31 | 60 | 54 | 11 | 55 | 12 | 66 | 59 | 19 | 12 | 90 | 71 | 7 | 12 | 18 | 47 | 67 |
|---|---|---|---|---|---|---|---|---|---|---|---|---|---|---|---|---|---|---|---|---|---|---|---|---|---|---|---|---|---|---|---|
| 42 | 46 | 79 | 64 | 78 | 106 | 7 | 64 | 6 | 70 | 79 | 88 | 6 | 94 | 55 | 16 | 102 | 22 | 31 | 52 | 90 | 22 | 79 | 52 | 66 | 58 | 67 | 100 | 18 | 70 | 55 | 88 |
| 80 | 93 | 3 | 62 | 56 | 93 | 51 | 50 | 32 | 81 | 99 | 2 | 56 | 21 | 51 | 14 | 104 | 57 | 27 | 2 | 80 | 81 | 99 | 50 | 32 | 33 | 3 | 2 | 44 | 81 | 3 | 38 |
| 23 | 19 | 84 | 66 | 95 | 43 | 60 | 66 | 11 | 19 | 96 | 102 | 71 | 7 | 36 | 102 | 11 | 19 | 24 | 90 | 35 | 43 | 84 | 30 | 95 | 103 | 84 | 54 | 47 | 79 | 24 | 78 |
| 19 | 4 | 30 | 106 | 19 | 28 | 18 | 58 | 67 | 76 | 90 | 70 | 7 | 28 | 54 | 22 | 19 | 28 | 42 | 10 | 7 | 40 | 18 | 58 | 43 | 88 | 78 | 58 | 103 | 100 | 18 | 94 |
| 75 | 50 | 32 | 45 | 15 | 98 | 32 | 9 | 3 | 38 | 68 | 33 | 3 | 74 | 32 | 9 | 51 | 26 | 92 | 105 | 99 | 86 | 44 | 33 | 15 | 50 | 44 | 57 | 39 | 26 | 68 | 69 |
| 36 | 30 | 11 | 43 | 84 | 42 | 95 | 79 | 60 | 90 | 95 | 79 | 24 | 66 | 47 | 67 | 36 | 30 | 11 | 7 | 24 | 90 | 59 | 31 | 36 | 54 | 35 | 91 | 60 | 90 | 95 | 19 |
| 78 | 94 | 55 | 40 | 30 | 22 | 79 | 40 | 102 | 82 | 19 | 88 | 102 | 82 | 7 | 64 | 90 | 94 | 43 | 88 | 54 | 34 | 43 | 4 | 54 | 46 | 7 | 40 | 90 | 70 | 19 | 100 |
| 104 | 45 | 15 | 14 | 56 | 93 | 27 | 26 | 80 | 105 | 63 | 2 | 44 | 33 | 87 | 2 | 44 | 81 | 63 | 38 | 8 | 69 | 27 | 50 | 56 | 57 | 63 | 26 | 68 | 105 | 3 | 62 |
| 35 | 19 | 24 | 54 | 59 | 55 | 60 | 30 | 59 | 19 | 24 | 30 | 83 | 31 | 36 | 30 | 35 | 7 | 24 | 18 | 11 | 19 | 24 | 66 | 59 | 91 | 36 | 42 | 59 | 103 | 72 | 42 |
| 103 | 76 | 18 | 22 | 55 | 4 | 54 | 58 | 91 | 76 | 102 | 34 | 79 | 40 | 42 | 106 | 55 | 4 | 78 | 22 | 103 | 88 | 30 | 70 | 91 | 40 | 66 | 106 | 55 | 64 | 102 | 106 |
| 51 | 38 | 32 | 21 | 87 | 38 | 44 | 33 | 99 | 74 | 44 | 9 | 51 | 26 | 32 | 93 | 51 | 38 | 32 | 105 | 75 | 14 | 32 | 81 | 15 | 62 | 92 | 69 | 39 | 62 | 92 | 57 |
| ▨ | 54 | 59 | 91 | 96 | 42 | 35 | 79 | 48 | 30 | 107 | 43 | 84 | 78 | 71 | 43 | 84 | 42 | 11 | 7 | 84 | 78 | 35 | 55 | 48 | 18 | 95 | 67 | 12 | 90 | 47 | 43 |
| 102 | 34 | 91 | 52 | 66 | 106 | 79 | 76 | 30 | 94 | 103 | 76 | 78 | 58 | 31 | 64 | 6 | 82 | 79 | 100 | 90 | 106 | 67 | 52 | 102 | 22 | 43 | 88 | 102 | 34 | 31 | 100 |
| 44 | 21 | 3 | 2 | 44 | 81 | 75 | 2 | 92 | 57 | 75 | 74 | 56 | 81 | 39 | 62 | 8 | 21 | 75 | 98 | 32 | 21 | 3 | 74 | 92 | 45 | 15 | 26 | 20 | 69 | 75 | 50 |
| 23 | 31 | 72 | 42 | 35 | 31 | 96 | 54 | 23 | 103 | 12 | 78 | 59 | 79 | 96 | 102 | 59 | 55 | 72 | 42 | 83 | 7 | 60 | 30 | 71 | 79 | 48 | 30 | 71 | 67 | 60 | 66 |
| 55 | 4 | 54 | 10 | 31 | 76 | 102 | 46 | 7 | 40 | 6 | 70 | 7 | 52 | 90 | 22 | 7 | 64 | 42 | 106 | 31 | 100 | 54 | 46 | 55 | 52 | 102 | 10 | 103 | 100 | 30 | 10 |
| 27 | 38 | 104 | 81 | 39 | 2 | 56 | 105 | 87 | 14 | 44 | 33 | 75 | 26 | 32 | 81 | 99 | 50 | 80 | 81 | 75 | 62 | 68 | 93 | 99 | 50 | 8 | 9 | 51 | 38 | 92 | 105 |
| 72 | 90 | 71 | 67 | 48 | 18 | 59 | 31 | 12 | 90 | 47 | 43 | 48 | 6 | 71 | 55 | 84 | 102 | 11 | 67 | ▨ | 102 | 71 | 55 | 60 | 42 | 35 | 55 | ▨ | 6 | 95 | 31 |
| 66 | 106 | 31 | 52 | 66 | 106 | 79 | 40 | 78 | 94 | 79 | 4 | 42 | 46 | 7 | 4 | 18 | 70 | 67 | 4 | 6 | 22 | 67 | 76 | 6 | 70 | 103 | 52 | 78 | 106 | 91 | 76 |
| 20 | 45 | 63 | 2 | 8 | 45 | 51 | 38 | 44 | 105 | 75 | 74 | 92 | 57 | 15 | 98 | 20 | 57 | 39 | 74 | 44 | 57 | 15 | 26 | 20 | 93 | 75 | 38 | 68 | 93 | 51 | 38 |
| 11 | 103 | 72 | 18 | 11 | 55 | 96 | 42 | 23 | 67 | 12 | 102 | 83 | 91 | 96 | 18 | 11 | 91 | 72 | 90 | 95 | 19 | 48 | 42 | 47 | 43 | 72 | 66 | 11 | 67 | 96 | 90 |
| 103 | 28 | 102 | 94 | 67 | 88 | 66 | 70 | 91 | 100 | 30 | 10 | 19 | 64 | 30 | 34 | 79 | 28 | 102 | 82 | 67 | 28 | 102 | 34 | 103 | 64 | 30 | 94 | 55 | 28 | 30 | 106 |
| 27 | 14 | 68 | 105 | 99 | 38 | 56 | 105 | 75 | 26 | 68 | 93 | 87 | 98 | 8 | 105 | 63 | 86 | 68 | 9 | 87 | 28 | 56 | 21 | 99 | 86 | 20 | 9 | 87 | 62 | 104 | 69 |
| 48 | 90 | 23 | 79 | 96 | 54 | 23 | 67 | 72 | 78 | 47 | 103 | ▨ | 42 | 23 | 55 | ▨ | 42 | 35 | 19 | ▨ | 90 | 47 | 67 | ▨ | 30 | 47 | 31 | ▨ | 66 | 83 | 43 |
| 18 | 46 | 7 | 16 | 90 | 106 | 19 | 16 | 6 | 82 | 67 | 16 | 42 | 82 | 31 | 28 | 18 | 106 | 79 | 16 | 6 | 34 | 55 | 16 | 66 | 82 | 91 | 16 | 6 | 82 | 103 | 16 |
| 80 | 93 | 27 | 26 | 56 | 69 | 99 | 62 | 68 | 81 | 99 | 86 | 20 | 9 | 99 | 86 | 104 | 9 | 87 | 86 | 104 | 105 | 87 | 62 | 68 | 21 | 99 | 14 | 20 | 81 | 87 | 98 |
| 47 | 19 | 12 | 42 | 83 | 79 | 96 | 42 | 83 | 91 | ▨ | 78 | 107 | 43 | 84 | 102 | 107 | 55 | 48 | 18 | 47 | 55 | 60 | 78 | 35 | 91 | 72 | 102 | 83 | 19 | 36 | 90 |
| 19 | 40 | 42 | 82 | 7 | 28 | 6 | 22 | 79 | 52 | 6 | 94 | 7 | 16 | 6 | 46 | 7 | 88 | 6 | 106 | 7 | 64 | 78 | 10 | 91 | 4 | 6 | 34 | 43 | 76 | 66 | 82 |
| 63 | 86 | 92 | 9 | 15 | 62 | 68 | 9 | 63 | 86 | 20 | 9 | 15 | 14 | 20 | 21 | 15 | 86 | 8 | 57 | 27 | 50 | 80 | 45 | 99 | 62 | 92 | 69 | 39 | 74 | 104 | 9 |

DIFFUSION γ TABLE 0

DIFFUSION γ TABLE 12

γ TABLE 0-24 PULSE WIDTH WHEN PWM 4 BIT DIFFUSION

DIFFUSION γ TABLE 24

DIFFUSION γ TABLE 36

DIFFUSION γ TABLE 48

DIFFUSION γ TABLE 60

DIFFUSION γ TABLE 72

DIFFUSION γ TABLE 84

DIFFUSION γ TABLE 96

IMAGE PROCESSING DEVICE, IMAGE PROCESSING METHOD, AND IMAGE PROCESSING PROGRAM

CROSS-REFERENCE TO RELATED APPLICATIONS

This application is based upon and claims the benefit of priority from the prior Japanese Patent Application No. 2004-209031, filed on Jul. 15, 2004, the entire contents of which are incorporated herein by reference.

BACKGROUND OF THE INVENTION

1. Field of the Invention

The present invention relates to an image processor, an image processing method and an image processing program, and more particularly to an image processor, an image processing method and an image processing program for generating image regeneration output data having accurate density characteristics and high grayscale characteristics, even for low bit image regeneration output data.

2. Description of the Related Art

An image processor used for such an image formation device as a printer and copier converts the grayscale input data of pixels into the image regeneration output data corresponding to the dot size in the pixels by half tone processing. The grayscale input data is 8 bit grayscale value data, for example, and is data having 256 grayscales between the minimum value (0% grayscale value) to the maximum value (100% grayscale value). Such grayscale input data is converted into the output data with the size of the dots formed in a pixel by a multi-value dither method. If the output data has 8 bits, the dot size in the pixel has 256 grayscales. And this output data is supplied to the print engine, and based on the supplied output data, the print engine forms dots in the pixels. Such image regeneration output data corresponds to the beam width data of the laser beam to be irradiated onto the image drum, or the pulse width data for driving the laser, for example, in the case of the electro-photography scanned by the laser beam.

According to general half tone processing, the grayscale input data is converted into the output data for image regeneration (pulse width data) by referring to a gamma table storing the output data corresponding to the grayscale input data. And based on this output data, the pulse width modulation unit generates drive pulse signals of the laser and supplies them to the print engine. By appropriately designing this gamma table, a desired screen can be provided using the output data for image regeneration. The screen characteristics includes the screen line count, for example.

Image processing involving such half tone processing is stated in Japanese Patent Application Laid-Open No. 2000-85187 and Japanese Patent Application Laid-Open No. 2000-228728, for example.

In conventional half tone processing, 8-bit grayscale input data, for example, is converted into output data with 8 or less bits, and the dot size in pixels is determined by this output data. Therefore the dot size in pixels generated as an image has the number of grayscales corresponding to the number of bits of the output data, and it is preferable to increase the number of bits of the output data in order to increase the number of grayscales.

SUMMARY OF THE INVENTION

Recently simplifying the configuration of the pulse width modulation unit for generating the drive pulse signals from the output data generated by half tone processing is desired by decreasing the number of bits of the output data, such as 4 bits, in order to decrease cost. The current configuration of the pulse width modulation unit becomes simpler and the cost decreases as the number of bits of the input data becomes less.

However if the number of bits of the output data is decreased, the number of grayscales of the dot size, which can be represented by the output data, decreases, and high grayscale characteristics and accurate density characteristics cannot be provided to the dots in the pixels to be regenerated. If the output data is 8 bits, for example, 256 grayscales can be represented, but if the output data is 4 bits, only 16 grayscales can be represented, which decreases the grayscale characteristics and makes it impossible to regenerate a desired density in the density characteristics.

With the foregoing in view, it is an object of the present invention to provide an image processor, an image processing method and an image processing program having high grayscale characteristics and accurate density characteristics even if the number of grayscales of the output data for image regeneration by half tone processing is low.

To achieve the above object, according to a first aspect of the present invention, the image processor comprises a half tone processing unit which converts the grayscale input data of pixels into image regeneration output data corresponding to a dot size of pixels, and a lookup table including a plurality of gamma tables storing image regeneration output data corresponding to the grayscale input data, corresponding to the position of the pixels of the grayscale input data. In the lookup table, a representative gamma table is allocated to each identical index pixel group disposed on a predetermined displacement vector, each representative gamma table is further composed of a plurality of diffusion gamma tables which are dispersed on a plane within the corresponding identical index pixel group, and the plurality of diffusion gamma tables have one of discrete image regeneration output data near the output grayscale value of the representative gamma table according to the grayscale input data. By dispersing the image regeneration output data of the plurality of diffusion gamma tables into discrete values near the ideal output grayscale value, the output grayscale value of the virtual representative gamma table can be reproduced at high precision using the dispersed plurality of image regeneration output data.

In the first aspect, it is preferable that the plurality of diffusion gamma tables are randomly dispersed within the corresponding identical index pixel group. By dispersing randomly, moiré patterns, which are generated when the plurality of gamma tables are placed with regularity, can be suppressed.

In the first aspect, it is preferable that the plurality of diffusion gamma tables randomly have one of discrete image regeneration output data near the output grayscale value of the representative gamma table according to the grayscale input data. By randomly having one of the discrete image regeneration output data near the ideal output grayscale value of the representative gamma table, visual tone jumps can be suppressed.

To achieve the above object, according to a second aspect of the present invention, the image processing method comprises a half tone processing step which converts the grayscale input data of pixels into the image regeneration output data corresponding to the dot size of the pixels by referring to a lookup table which has a plurality of gamma tables storing image regeneration output data corresponding to the grayscale input data, corresponding to the position of the pixel of the grayscale input data. This lookup table comprises a plurality of diffusion gamma tables for each identical index pixel group disposed on a predetermined displacement vector, just like the first aspect.

To achieve the above object, according to a third aspect of the present invention, the image processing program causes a computer to execute a half tone processing procedure for converting the grayscale input data of pixels into the image regeneration output data corresponding to the dot size of the pixels by referring to a lookup table which has a plurality of gamma tables storing image regeneration output data corresponding to the grayscale input data, corresponding to the position of the pixels of the grayscale input data. And the lookup table is the same as the second aspect.

BRIEF DESCRIPTION OF THE DRAWINGS

FIG. 3 are diagrams depicting the growth of dots in pixels when the input grayscale value is incremented in the example in FIG. 2;

FIG. 5 is an enlarged view of the gamma table when the output grayscale is 4 bits;

FIG. 8 shows an identical index pixel group having a representative gamma table according to the present embodiment;

FIG. 9 shows an index table with respect to the diffusion gamma table according to the present embodiment;

DESCRIPTION OF THE PREFERRED EMBODIMENTS

Embodiments of the present invention will now be described with reference to the drawings. The technical scope of the present invention, however, is not limited to these embodiments, but shall include the matters stated in the claims and equivalents thereof.

Figure 1:
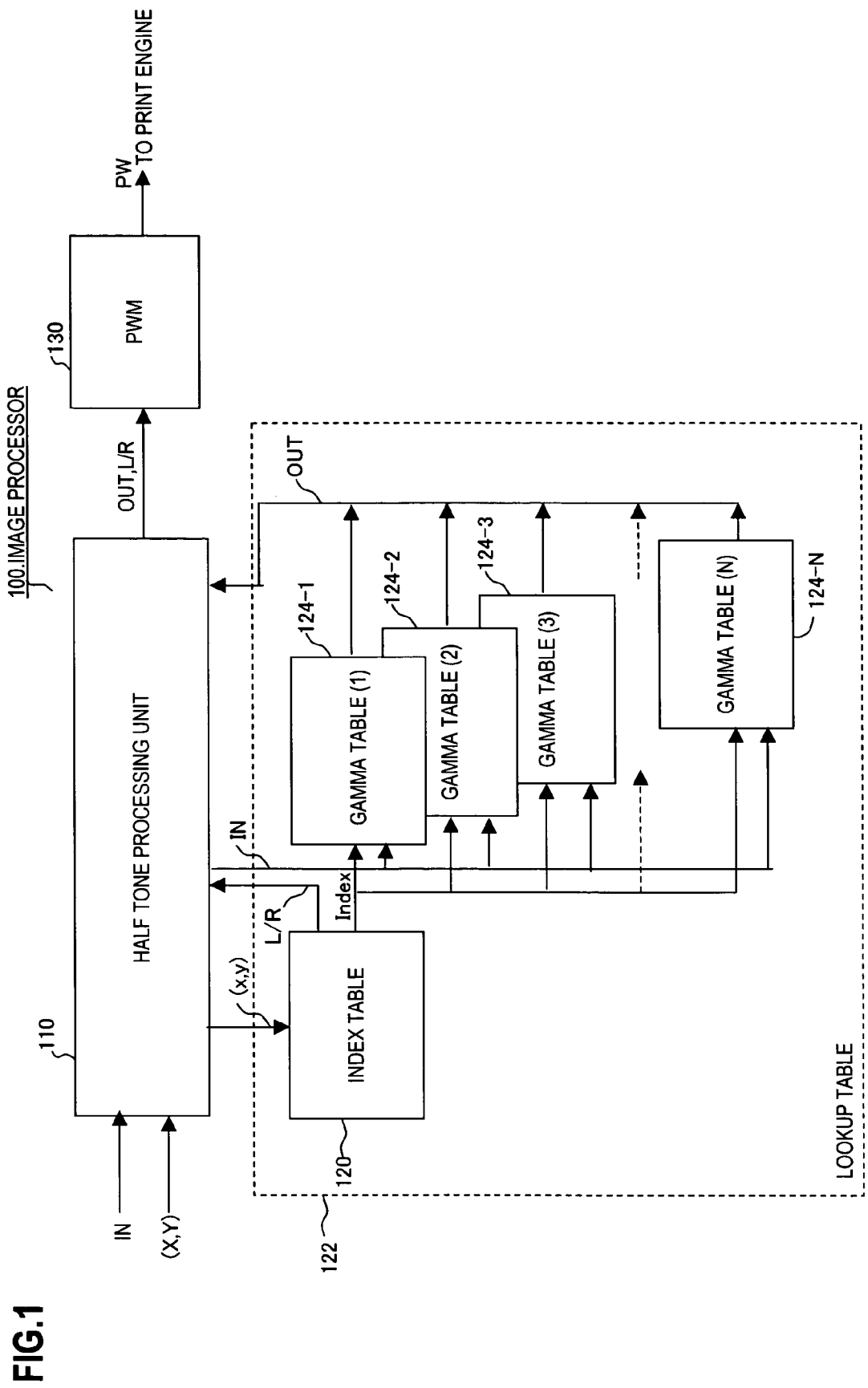
FIG. 1 is a block diagram depicting an image processor according to the present embodiment.

FIG. 1 is a block diagram depicting the image processor according to the present embodiment. The image processor 100 comprises a half tone processing unit 110 for converting the grayscale input data IN of the pixel into the image regeneration output data OUT corresponding to the dot size of the pixel, and a lookup table 122 comprising a plurality of gamma tables 124-1-124-N storing the image regeneration output data OUT corresponding to the grayscale input data IN, corresponding to the position of the pixel (X, Y) of the grayscale input data. The lookup table 122 is a high-speed static RAM, for example, and comprises an index table 120 having the index Index for specifying the gamma table to be referred to according to the position of the pixel (X, Y). The half tone processing unit 110 determines the pixel position (x, y) of the index table 120 to be referred to corresponding to the pixel position (X, Y), and refers to the index table 120 based on the pixel position (x, y). And referring to the gamma tables 124-1-124-N corresponding to the index number Index of the index table 120 which was referred to, the half tone processing unit 110 acquires the image regeneration output data OUT. And the half tone processing unit 110 supplies the acquired image regeneration output data OUT to the pulse width modulation unit 130, and the pulse width modulation unit 130 generates the drive pulse width signal PW, and supplies it to the print engine, which is not included in FIG. 1. In the print engine, a beam is irradiated onto the image drum based on the drive pulse width signal PW, and forms an electrostatic latent image on the image drum. And toner is attached to this electrostatic latent image and is developed into dots, and transferred onto a recording medium, such as recording paper. Therefore the image regeneration output data OUT is the regeneration data for the print image on the dot size of the pixels. This image regeneration output data OUT includes information L/R which indicates whether the positions of the dots generated in a pixel are left-justified or right-justified. In the embodiments described herein below, the information L/R to indicate left-justified or right-justified is output from the index table 120.

Figure 2:
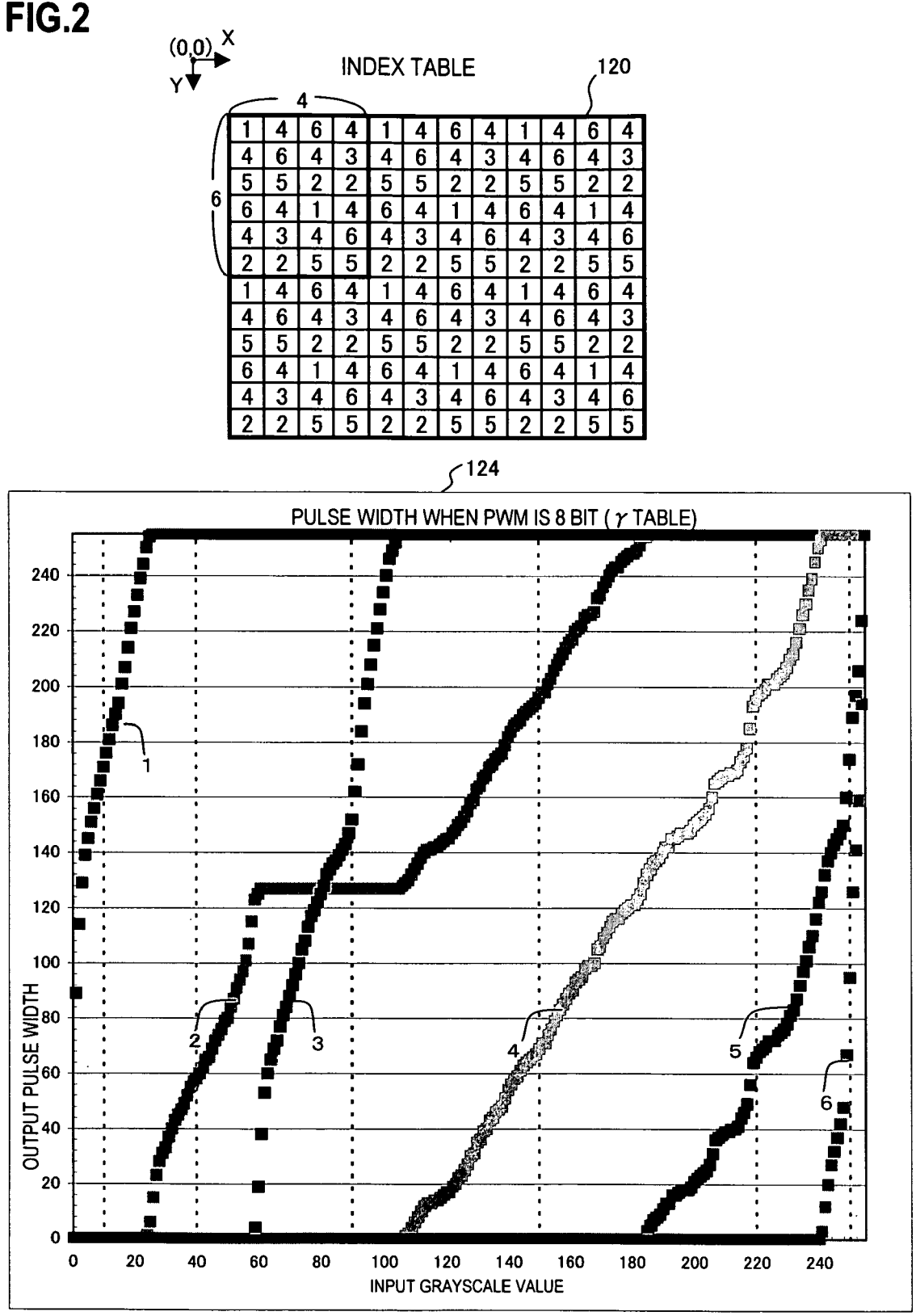
FIG. 2 shows a relationship of a general index table and gamma tables.

FIG. 2 shows a general relationship between a index table and gamma tables. In the index table 120 shown here, the gamma table numbers 1-6 to be referred to are stored in a 12×12 matrix. The index table 120 is a repeat of the minimum matrix unit 4×6 enclosed by the bold line, and in this minimum matrix unit the gamma table 1 is stored at two locations, the gamma table 2 at four locations, the gamma table 3 at two locations, the gamma table 4 at eight locations, the gamma table 5 at four locations and the gamma table 6 at four locations. By a repeat of this minimum matrix unit, the gamma table 1 is repeatedly positioned at the displacement vectors (+2, +3), (+2, −3), (−2, +3) and (−2, −3). The origin of the coordinates (X, Y) is the top position at the right of the index table 120 in FIG. 2. The gamma tables 2 are adjacent to each other in the X direction and repeatedly positioned at the displacement vectors (+2, +3), (+2, −3), (−2, +3) and (−2, −3). Other gamma tables are also positioned on a respective displacement vector.

As described above, an identical index number is assigned to the pixel group disposed on a same displacement vector, and a gamma table corresponding to this index number is referred to. So the pixel group disposed on a same displacement vector is called an "identical index pixel group".

FIG. 2 shows six types of gamma tables 124. A gamma table stores an output pulse width value, which is the image regeneration output, according to the input grayscale value, and in FIG. 2 the gamma table 1 has output pulse width values which grow from the minimum value to the maximum value in an area where the input grayscale value is low. The gamma tables 2, 3 and 4 have output pulse width values which grow from the minimum value to the maximum value in an area where the input grayscale value is medium, and the gamma tables 5 and 6 have output pulse width values which grow from the minimum value to the maximum value in an area where the input grayscale value is relatively high.

FIG. 3 shows the growth of the dots of pixels when the input grayscale value is increased in the example in FIG. 2. According to the above mentioned gamma tables and the index table 120, according to the increase of the input grayscale value, while the input grayscale value is low (input grayscale values 10, 40, 90), dots are formed in pixels in index 1 (input grayscale value 10), then dots are formed in the pixels in index 2 (input grayscale value 40), and dots are formed in pixels in index 3 in parallel with the pixels in index 2 (input grayscale value 90). In other words, while the input grayscale value is low, dots sequentially grow in pixels in index 1, 2 and 3 of the index table 20. And while the input grayscale value is high (input grayscale values 150, 220, 250), dots grow in pixels in index 4 (input grayscale value 150), then dots grow in pixels in indexes 5 and 6 (input grayscale values 220, 250).

Therefore as the growing dots with input grayscale values 90 and 150 show, a screen line is formed on the line connecting the pixels of index 1.

The gamma table 124 in FIG. 2 has an 8 bit output pulse width for the 8 bit input grayscale value. Therefore the gamma table 124 has 256 grayscales (0-255) of output for 256 grayscales of input. Therefore corresponding to the change of grayscales of the input grayscale value, the output grayscale value of a gamma table can be changed when necessary. However when the output pulse width data is 6 bits, since an output has only 64 grayscales (0-63), an output grayscale value of the gamma table may not be able to be changed corresponding to the change of grayscales of the input grayscale value in some cases. If the output pulse width data is 4 bits, the output thereof has only 16 grayscales (0-15), and there are more cases when the output grayscale value cannot be changed according to the change of grayscales of the input grayscale value. If the number of bits of the output data further decreases, the grayscales thereof become further discrete, and the grayscale resolution of the dot size that can be reproduced drops.

Figure 4A:
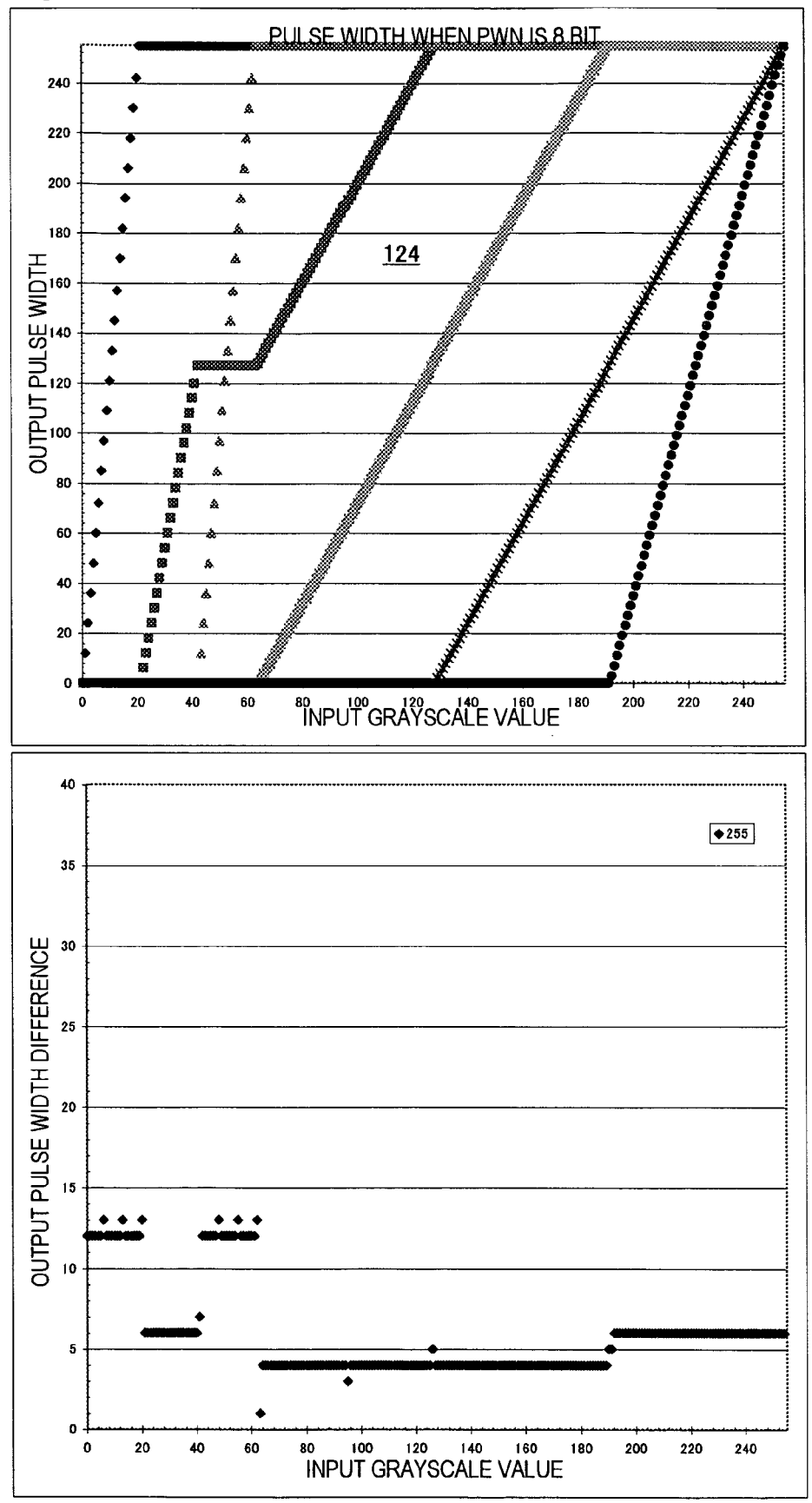
FIG. 4A-4C show the change of the output grayscale value with respect to the change of the input grayscale value of the gamma table.
Figure 4B:
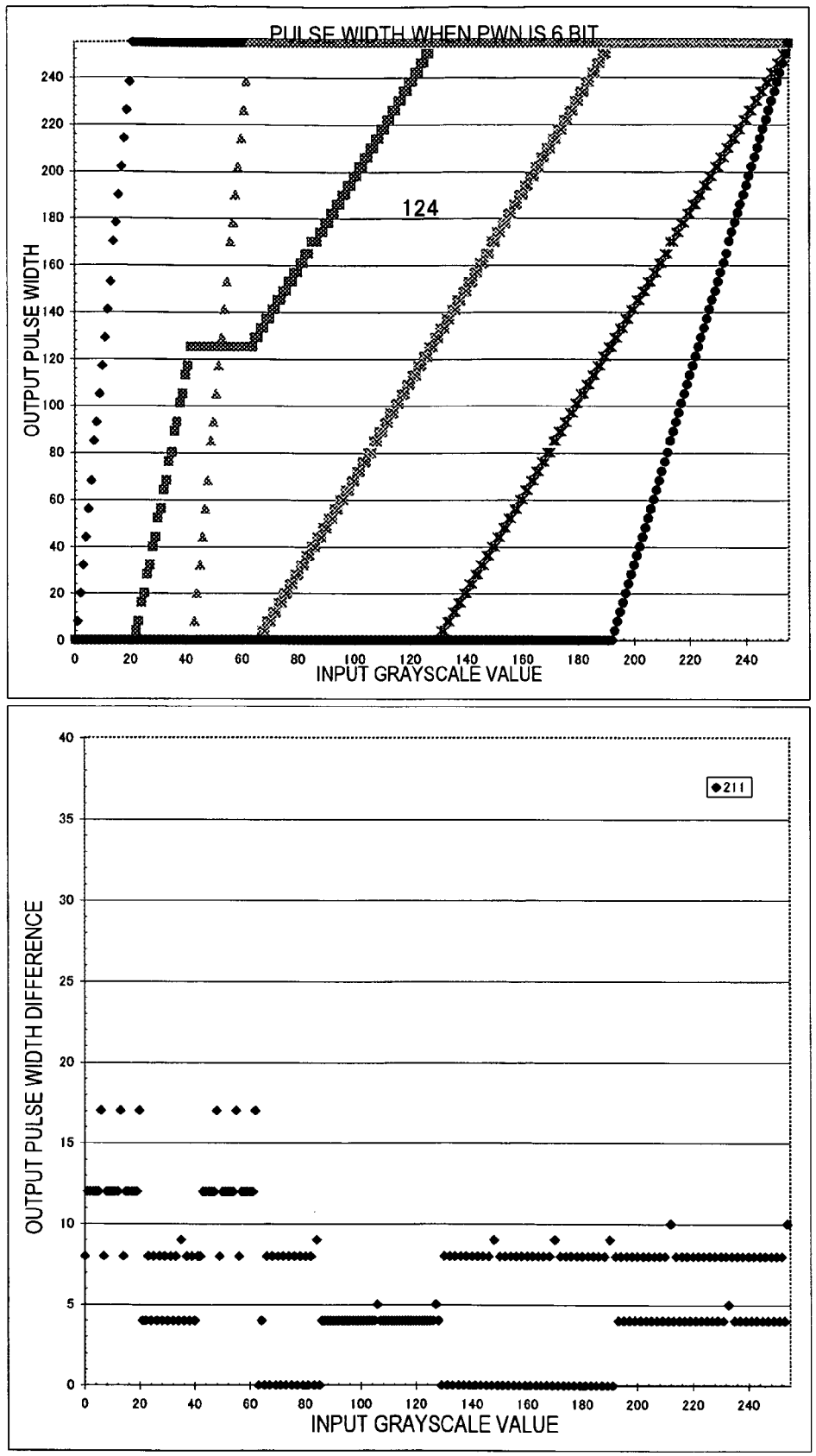
Figure 4C:
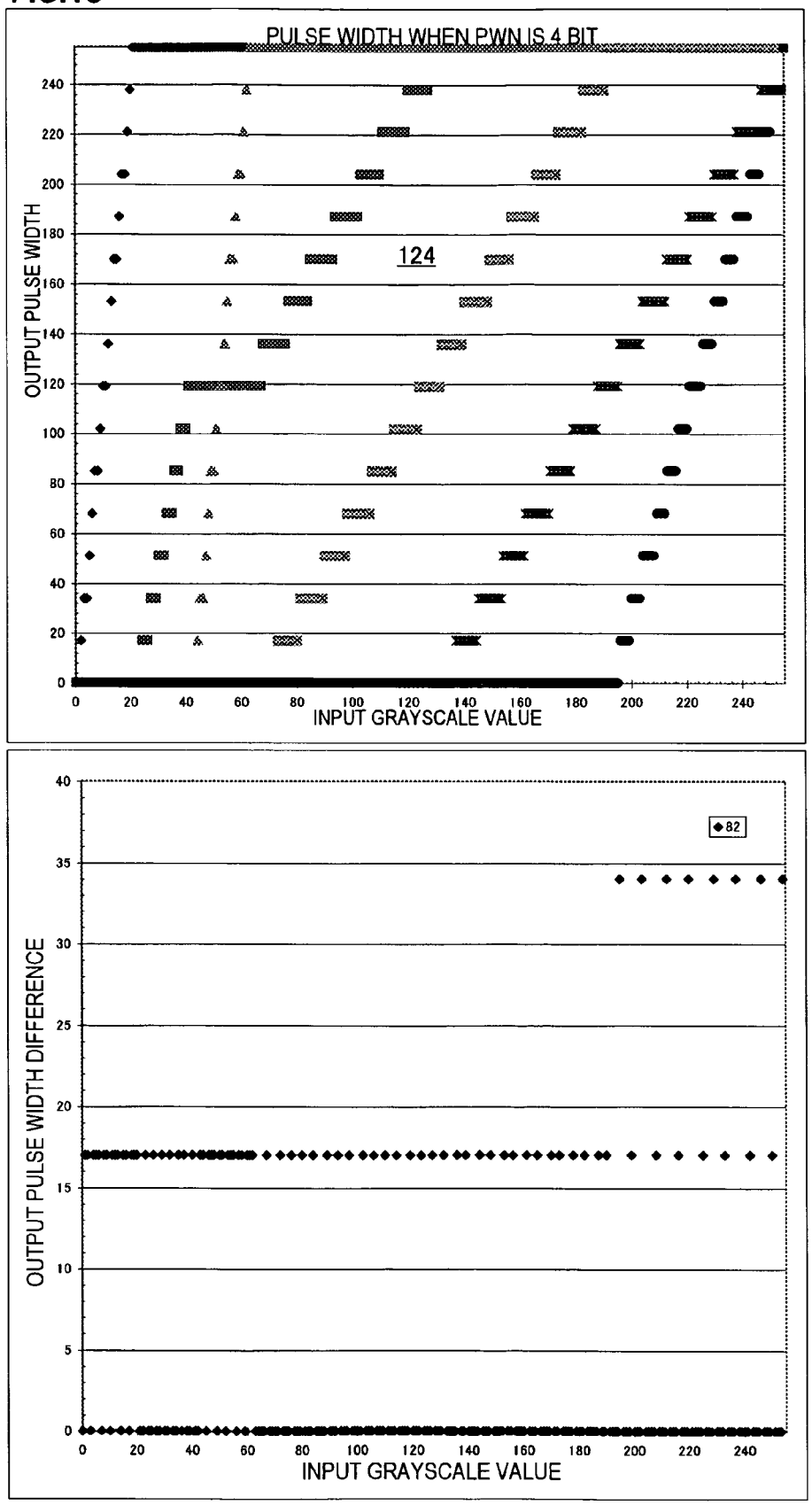

FIG. 4A-4C show the change of the output grayscale value with respect to the change of the input grayscale value of the gamma tables. In the gamma table in FIG. 2, the difference (change) of the total grayscale values of the output data of the six gamma tables when the input grayscale value changes one grayscale is shown, where FIG. 4A is the case when the output data is 8 bits, FIG. 4B is the case when the output data is 6 bits, and FIG. 4C is the case when the output data is 4 bits. In FIGS. 4A, 4B and 4C, the top shows the gamma table, and the bottom shows the difference of the total output grayscale value.

In the case of the 8 bit output data in FIG. 4A, the gamma table 124 thereof is the same as the gamma table 124 in FIG. 2. In this case, the difference of the output pulse width when the input grayscale value changes one grayscale is all a value other than 0 grayscales, and when the input grayscale value changes 255 times, the total output pulse width also changes 255 times. Therefore the output pulse width value which faithfully changes with respect to the change of the input grayscale value can be generated as output data.

In the case of the 6(M=6) bit output data in FIG. 4B, the minimum width of the output of each gamma table 1-6 is $255/(2^M-1)=4$, and according to the gamma table 124 at the top, the spaces of the discrete values of the output pulse width are relatively rougher compared with the case of FIG. 4A. Therefore while the input grayscale value changes 255 times, the total output pulse width does not change the grayscale 44 times, but changes the grayscale only 211 times.

In the case of the 4(M=4) bit output data in FIG. 4C, the minimum width of the output of each gamma table 1-6 is $255/(2^M-1)=17$, and according to the gamma table 124 at the top, the spaces of the discrete values of the output pulse width is even rougher compared with the cases of FIG. 4A and FIG. 4B. Therefore while the input grayscale value changes 255 times, the total output pulse width changes only 82 times, and no grayscale changes for 173 times. Also the difference of the output pulse width is mostly 0 or 17, and in a high input grayscale value area, in some cases the difference of the output pulse width becomes 34.

In other words, as a result of decreasing the number of grayscales of the output data by decrease the number of bits of the output data, the case when the difference of the output pulse width becomes 0 increases, and when it does change, the difference amount increases. This means that while the input grayscale value is 255, the number of grayscales of the output pulse width dramatically decreases and the difference also dramatically increases, that is the high grayscale characteristics and accurate density characteristics are diminished.

FIG. 5 is an enlarged view of the gamma table when the output grayscale is 4 bits. In FIG. 5, the solid line indicates the input/output characteristics of the gamma table G, and the ordinate is the grayscale value when the output pulse width is 8 bits (256 grayscales). As described above, the minimum width of the 4 bit output grayscale is 17, so possible discrete points are 0, 17, 34, 51, 68, 85, 102, 119, 136, 153, 170, 187, 204, 221, 238 and 255 in the case of 8 bits (256 grayscales). The ordinate in FIG. 5 shows a part of these discrete points, that is the output discrete points 153, 170 and 187. In the gamma table G indicated by the solid line, the grayscale values at the point indicated by the squares W, X and Y are output as an output data in the case of 8 bits, but in the case of 4 bits which can take only the discrete points 153, 170 and 187, the grayscale values indicated by block dots are output as the output data. For example, the square X becomes the output grayscale value 161 in the 8 bit output, but becomes the output grayscale value 153 at the black dots near the square X in the case of the 4 bit output (1001=9 in the case of 4 bits). In other words, in the case of the 4 bit output data, the grayscale values become more discrete and can no longer be matched with the grayscale values of the 8 bit output data. On one hand the output grayscale values 145 and 161 of the square W and X in the 8 bit output data becomes the same output grayscale value 153, in the 4 bit output data, and the difference of the output grayscale value is 0, but on the other hand, the output grayscale values 161 and 167 of the squares X and Y in the 8 bit output data become 153 and 170 in the 4 bit output data, and the difference of the output grayscale value thereof is 17. Therefore in the 4 bit output grayscale values, the difference with respect to the change of the input grayscale value becomes 0 in some cases, or may become a large value which is different from the difference of the output grayscale value, which is expected with respect to the change of the input grayscale value.

Figure 6:
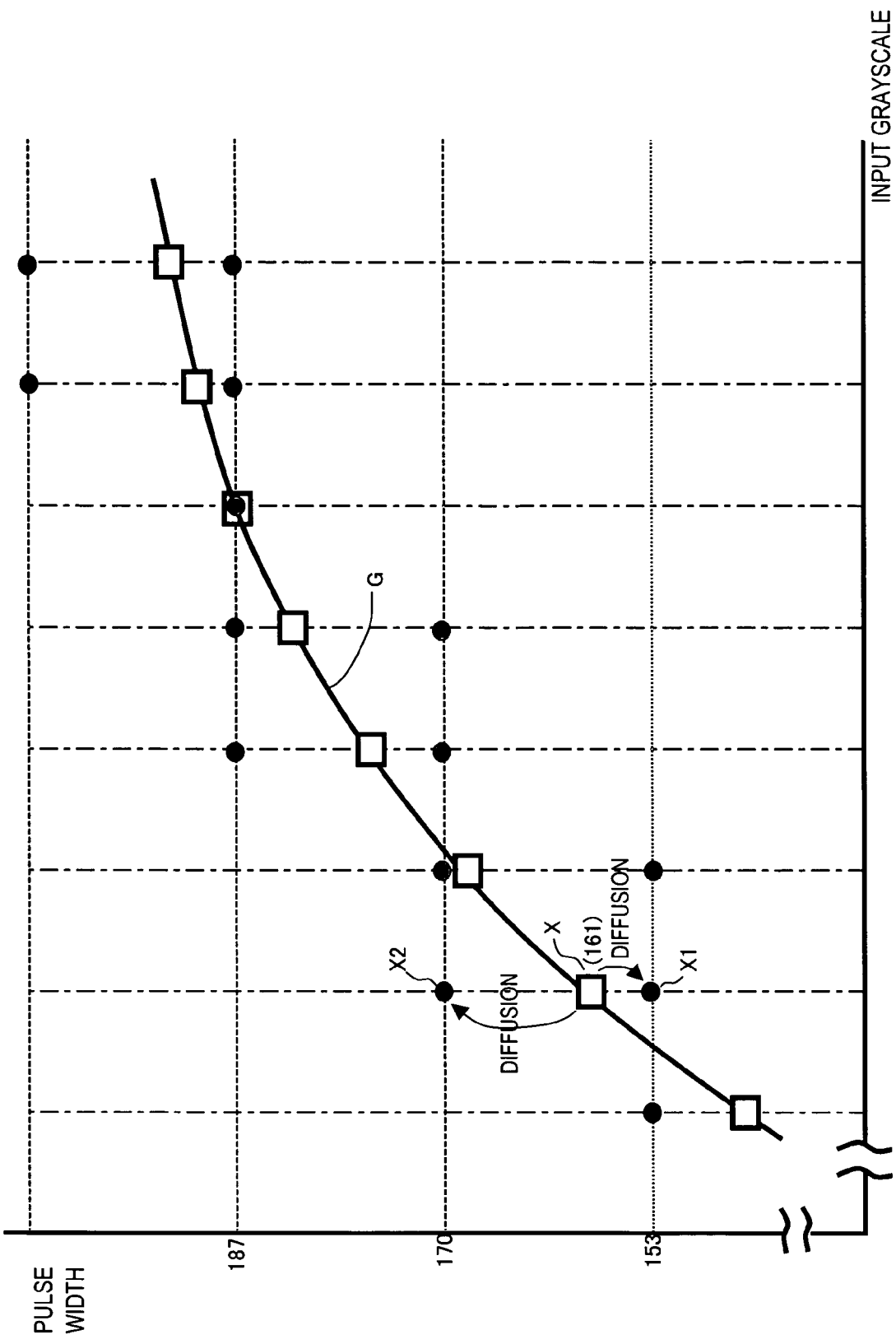
FIG. 6 shows the principle of the diffusion gamma table according to the present embodiment.

FIG. 6 describes the principle of the diffusion gamma table of the present embodiment. According to the principle of the diffusion gamma table, the discrete points X1 (output grayscale value 153) and X2 (output grayscale value 170) in 4 bit output, which are near the square X with the output grayscale value 161 in 8 bit output, are assigned to a plurality of diffusion gamma tables, and the number of diffusion gamma tables having the discrete points X1 and X2 is optimized so that the average output grayscale value thereof becomes closest to 161 of the square X. For example, if there are five discrete points X1 and four discrete points X2, then the average value of the output grayscale value of the nine discrete points is (153×5+170×4)/9=160.55, which is a value close to 161, the output grayscale value of the square X. In this way, even if only output grayscale value having the large discrete width can be generated, as in the case of the 4 bit output, a grayscale value extremely close to the output grayscale value of the square X of the gamma table G can be expressed by assigning the different discrete values X1 and X2 to a plurality of pixels. Here the gamma table G is called a "representative gamma table", and a table having different discrete values is called a "diffusion gamma table".

Figure 7:
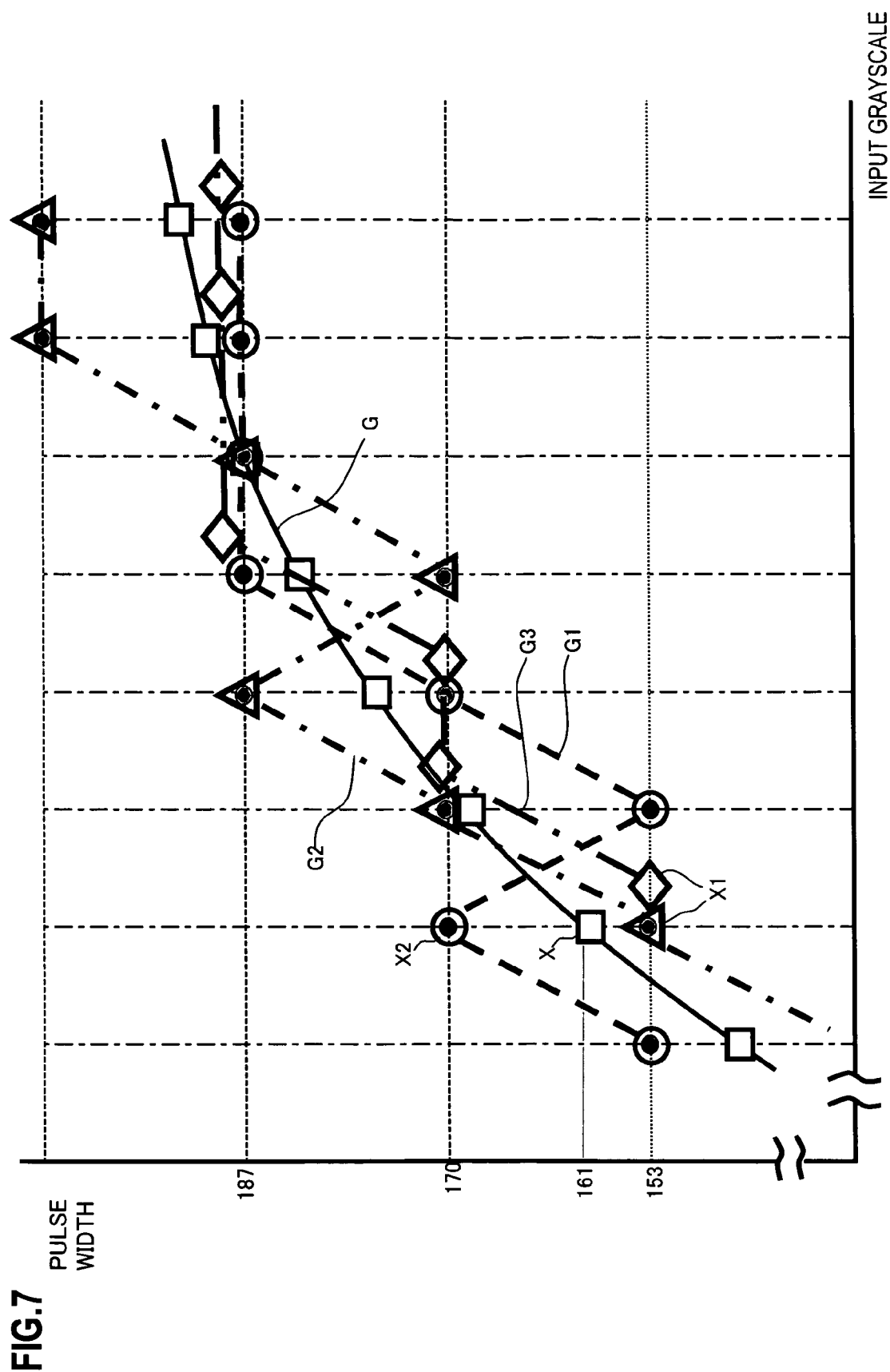
FIG. 7 shows an example when a plurality of diffusion gamma tables G1, G2 and G3 are assigned to the representative gamma table G.

FIG. 7 shows an example when a plurality of diffusion gamma tables G1, G2 and G3 are assigned to the representative gamma table G. To simplify the indication, in this example three diffusion gamma tables G1, G2 and G3 are assigned to a representative gamma table G. The diffusion gamma table G1 has a discrete point at the circle (e.g. X2) out of the 4 bit discrete points (e.g. X1 and X2) positioned near the square (e.g. X) of the representative gamma table G, and has an output value which changes up and down near the representative gamma table G. In the same way, the diffusion gamma table G2 has a discrete point of the triangle out of the 4 bit discrete points near the square, and the diffusion gamma table G3 has a discrete point of the rhombus out of the 4 bit discrete points near the square. For example, the square X is diffused or dispersed to two discrete points X1 and one discrete point X2. In this case, the average value is (153×2+170×1)/3=158.7. In this way, by increasing the number of diffusion gamma tables for diffusion or for dispersion, the average value of the output grayscale values thereof can become closer to the output grayscale value of the representative gamma table G.

And as the index table in FIG. 2 shows, a plurality of pixels to have the same representative gamma table G exist in a predetermined area of the pixel matrix, so the representative gamma table G of the plurality of pixels is assigned to different diffusion gamma tables, then an ideal output grayscale value of the representative gamma table can be expressed on a plane in this predetermined area. The positions of the plurality of diffusion gamma tables should be dispersed, and preferably dispersed irregularly or randomly, rather than regularly. The discrete value of each diffusion gamma table should be one of the 4 bit discrete values near the output grayscale value of the representative gamma table G, but preferably be one of the 4 bit discrete values near it selected randomly.

Figure 17:
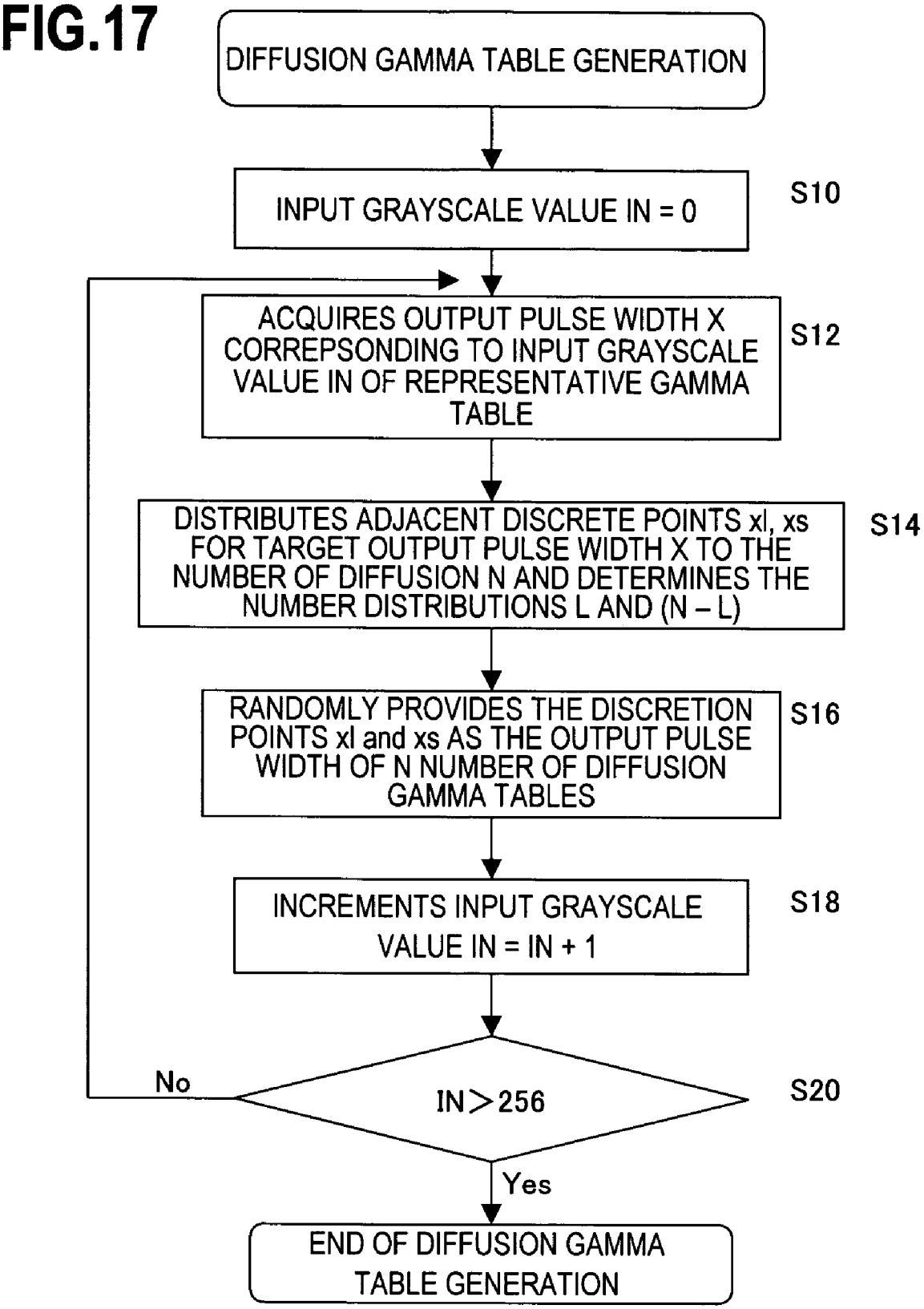
FIG. 17 is a flow chart depicting the generation of a diffusion gamma table from the representative gamma table according to the present embodiment.

FIG. 17 is a flow chart depicting the generation of the diffusion gamma table from the representative gamma table according to the present embodiment. The methods described in FIG. 6 and FIG. 7 are summarized herein below. First for a representative gamma table G, the output pulse width X corresponding to the input grayscale value IN is acquired (S12). In the example in FIG. 6, X=161. And the adjacent discrete points xl=170 and xs =153 of the target output pulse width X=161 are distributed to the number of diffusions N=3, and the number of distributions L1=1 and N−L=2 of xl and xs are determined. The number of distributions L of xl can be determined by, for example, L=INT [{(X−xs)/(xl−xs)}×N+0.5]. Here INT [ ] indicates round off processing. In the case of the above example, L=INT[{(161−153)/(170−153)}×3+0.5]=1. And for N=3 of the diffusion gamma tables, the discrete value xl=170 is provided to L (=1) diffusion gamma table, and the discrete value xs=153 is provided to N−L (=2) diffusion gamma tables at random. The positions of N=3 of the diffusion gamma tables are also determined at random.

And the average value x of the output value xl=170 of L=1 and the output value xs=153 of N−L=2, out of the diffused N=3 of the diffusion gamma table, becomes x={xl×L−xs×(N−L)}/N=158.7. By increasing the number of diffusions N, the accuracy of the average value x can be increased.

FIG. 8 shows an identical index pixel group having a representative gamma table according to the present embodiment. The index table 120 shown here is an example when the index numbers 1-6 of the index table 120 in FIG. 2 are converted into the new index numbers 0-11, and for the even numbers 0, 2, 4, 6, 8, and 10 of the new index numbers, the dots in pixels are left-justified, and for the odd numbers 1, 3, 5, 7, 9 and 11, the dots in the pixels are right-justified, and the information L/R of the even number/odd number of the index number is added to the image regeneration output data OUT for the pulse width modulation unit. Therefore in the 4×6 matrix at the upper left in this index table in FIG. 8, the index numbers 0, 2, 3, 4, 6, 7, 8, 9, 10, and 11 are assigned, and the gamma table 1 in FIG. 2 is referred for the index number 0, the gamma table 2 is referred for the index numbers 2 and 3, the gamma table 3 is referred for the index numbers 4 and 5, the gamma table 4 is referred for the index numbers 6 and 7, the gamma table 5 is referred for the index numbers 8 and 9, and the gamma table 6 is referred for the index numbers 10 and 11.

In FIG. 8, concerning the identical index pixel group with the index number 0 disposed at a position of the displacement vectors (±2, ±3), two [index numbers 0s] are disposed in the small 4×6 pixel matrix at the upper left, and 24 [index number 0s] are disposed in the 16×18 pixel matrix in FIG. 8. So according to the present embodiment, a plurality (nine types) of the diffusion gamma tables are assigned to the representative gamma table 0 of the identical index pixel group with the index number 0. And the plurality of diffusion gamma tables are dispersed on a plane within the identical index pixel group, preferably at random.

Figure 12:
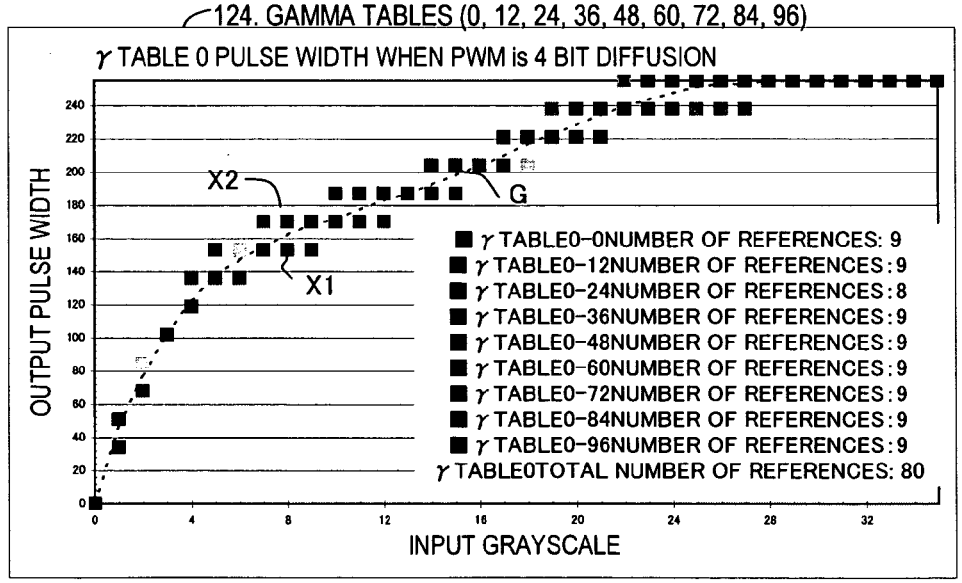
FIG. 12 shows an index table and a gamma table with respect to the diffusion gamma table according to the present embodiment.

FIG. 9 shows an index table corresponding to the diffusion gamma table according to the present embodiment. In the present embodiment, 80 pixels of identical index pixel group with index 0 disposed in a wide pixel matrix (32×30 pixel matrix), which is mentioned later in FIG. 12, are assigned to nine types of diffusion gamma tables. In the index table 120A in FIG. 9, only a part of the pixel matrix is shown. In the correspondence table 121B shown at the bottom of FIG. 9, the correspondence of the index numbers in FIG. 2, FIG. 8 and FIG. 9 are shown. For the pixel group with index 0 in FIG. 8, the index numbers 0, 12, 24, 36, 48, 60, 72, 84 and 96 of the diffusion gamma table are assigned. Assignment is made to random positions on a plane. To the identical index pixel group with another index number in FIG. 8 as well, nine types or eight types of diffusion gamma tables are assigned respectively. The index numbers of the assigned diffusion gamma tables are shown in the correspondence table 121B.

Figure 10:
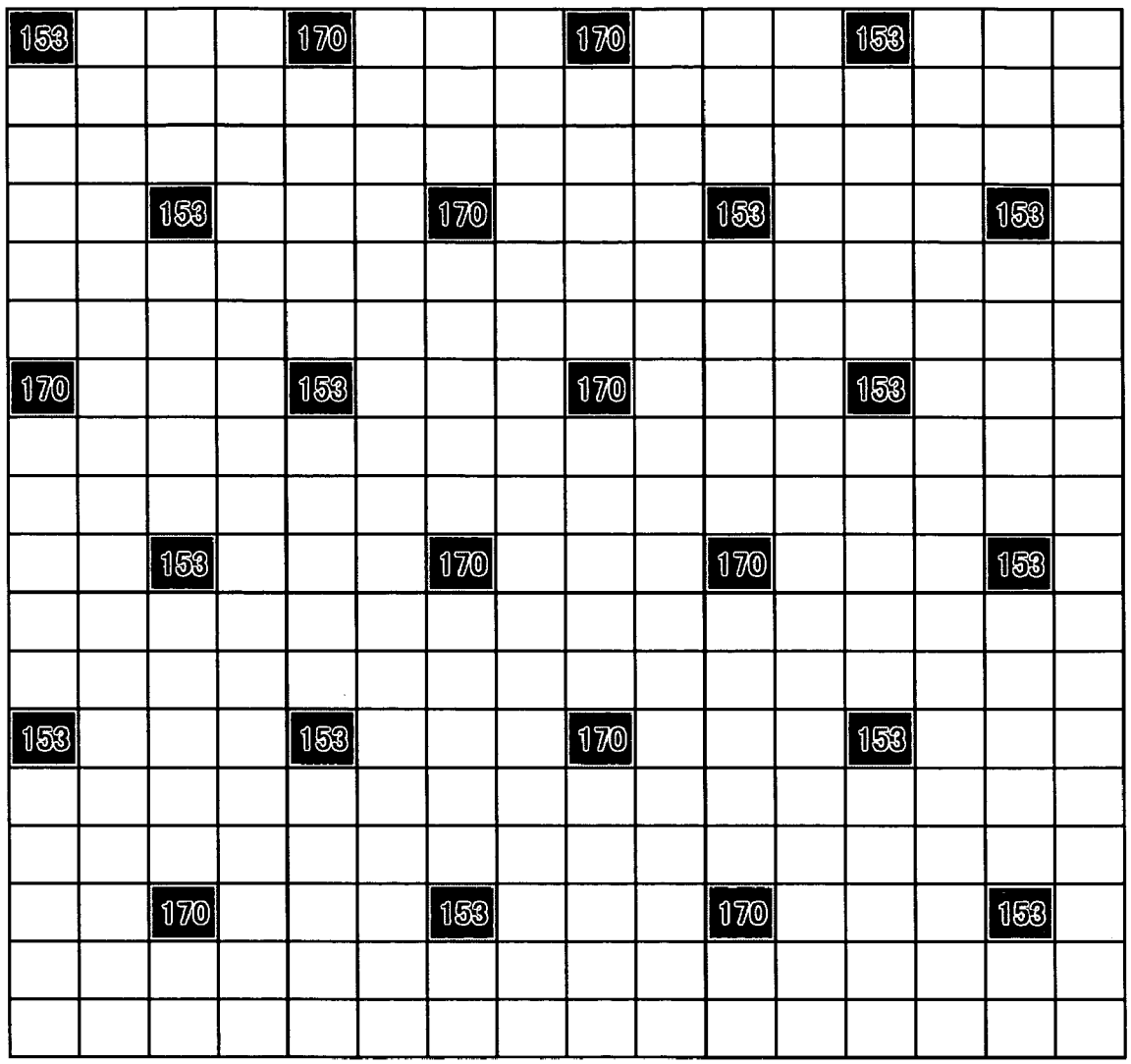
FIG. 10 shows an example of the output grayscale values that the diffusion gamma table shown in FIG. 9 could have.

FIG. 10 shows an example of the output grayscale values that the diffusion gamma table shown in FIG. 9 could possible store. To the output grayscale value 161 at the square X shown in FIG. 6, the 4 bit discrete point X1 (output grayscale value 153) and the discrete point X2 (output grayscale value 170) are assigned to the diffusion gamma tables 0, 12, 24, 36, 48, 60, 72, 84 and 96 at random. Out of the nine types of diffusion gamma tables corresponding to the representative gamma table 0 of the 24 pixels shown here, the discrete point X1 (output grayscale value 153) is assigned to 13 diffusion gamma tables, and the discrete point X2 (output grayscale value 170) is assigned to 10 diffusion gamma tables at random. The assignment ratio is roughly 13:10=5:4. In this way, the plurality of diffusion gamma tables assigned to a representative gamma table are disposed at random, and discrete points near the output grayscale value of the representative gamma table are also assigned at random for the diffusion gamma tables, so grayscale values extremely similar to the output grayscale value 161 of the representative gamma table can be spatially represented. For the other diffusion gamma tables shown in FIG. 9, 4 bit discrete points near the output grayscale value of the corresponding representative gamma table are assigned at random.

Figure 11:
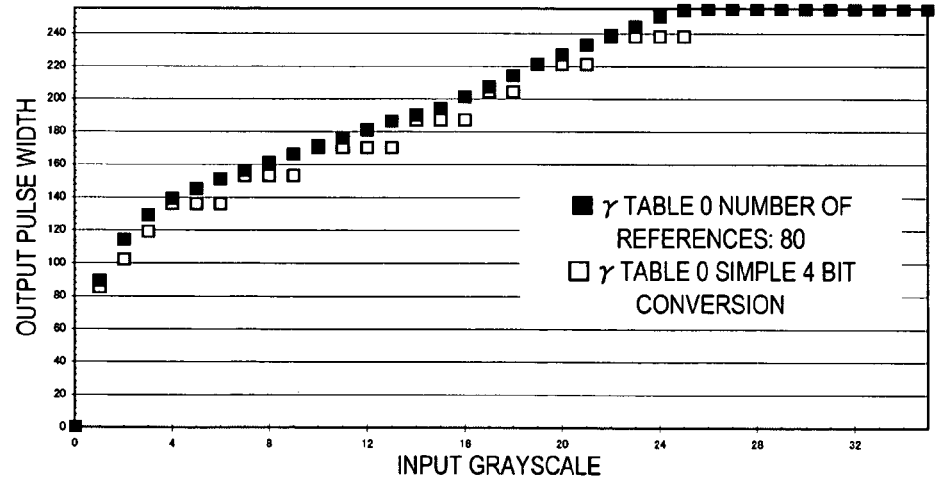
FIG. 11 shows an example of the index table of the representative gamma table for 8 bit output and the representative gamma table thereof.

FIG. 11 shows an example of the index table of the representative gamma table for 8 bit output and this representative gamma table. This index table 120 is the same as the index table 20 in FIG. 8, and the pixel size is expanded to 32×30. As described in FIG. 8, the identical index pixel group of index 0 (representative gamma table 0) in the index table 120 is disposed at a position of the same displacement vector (±3, ±4). In the pixel matrix 32×30, a total of 80 identical index pixels with index 0 exist. And the representative gamma table 0 thereof has an 8 bit output pulse width along with the increase of input grayscales, as shown in the black squares in FIG. 11. If this representative gamma table 0 is simply changed to a 4 bit output pulse width, only the discrete values can be taken, as shown in the white squares in FIG. 11.

In FIG. 11, in addition to the index 0 of the representative gamma table 0, the index of the representative gamma tables 2, 3, 4, 6, 7, 8, 9, 10 and 11 are also included. These identical index pixel groups are also disposed at positions on a same displacement vector respectively.

FIG. 12 shows an index table and a gamma table with respect to the diffusion gamma table according to the present embodiment. This index table 120A is the same as the index table 120A in FIG. 9, where the pixel size is expanded to 32×30. In FIG. 12, the pixel group with index 0 corresponding to the representative gamma table 0 is indicated by half tones. And nine types of diffusion gamma tables are assigned to 80 identical index pixels (index 0) in FIG. 11. In other words, the representative gamma table 0 is dispersed or diffused to nine diffusion gamma tables 0 and 12, eight diffusion gamma tables 24, and nine diffusion gamma tables 36, 48, 60, 72, 84 and 96. In the index table 120A, the index numbers of a plurality of diffusion gamma tables are also assigned to other representative gamma tables.

In the diffusion gamma table 124 shown in FIG. 12, the 4 bit output pulse width of nine types of diffusion gamma tables is plotted. In other words, to the representative gamma table G shown by the broken line, the 4 bit discrete values x1 and x2 adjacent to the output value thereof are assigned as the output value of the diffusion gamma table. In other words, one of the discrete values, X1 and X2, is assigned to the output values of the nine types of diffusion gamma tables. Therefore to one of the discrete values X1 and X2, a total of nine types of diffusion gamma tables are assigned. This discrete value is a single or a plurality of 4 bit discrete value(s) which is (are) close to the output value of the representative gamma table G, and these discrete values are assigned to a plurality of diffusion gamma tables so that the average of these discrete values becomes close to the output value of the representative gamma table.

Figure 13A:
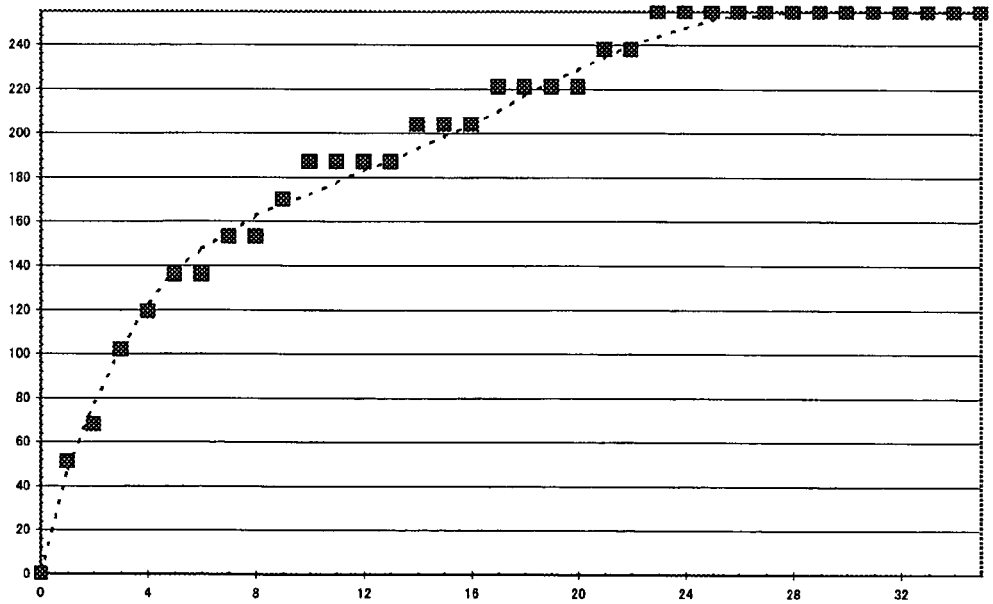
FIG. 13A-13C show the positioning of nine types of diffusion gamma tables in FIG. 12 and the table values.
Figure 13B:
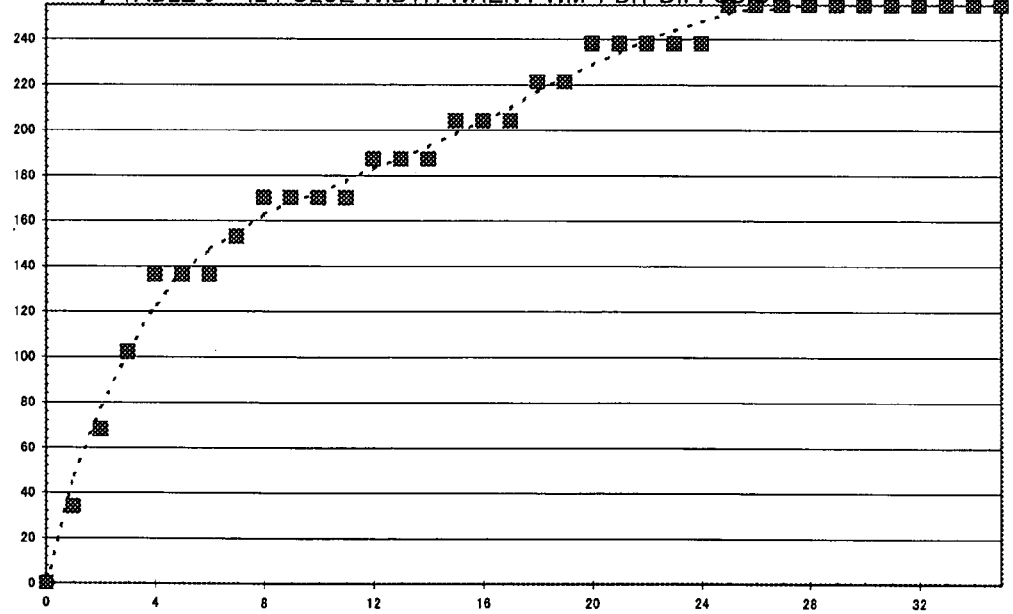
Figure 13C:
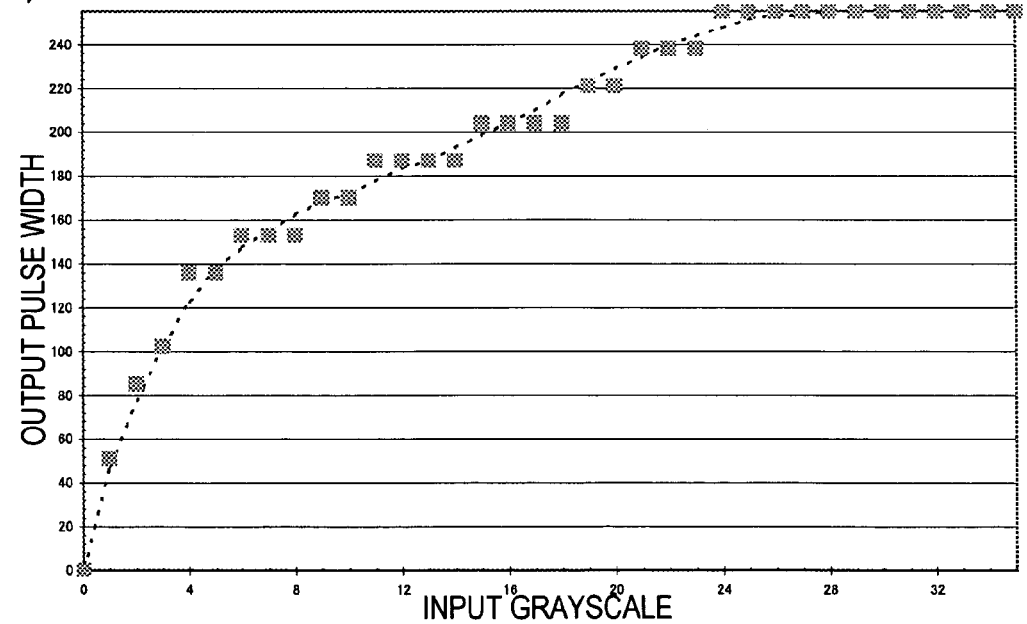
Figure 14A:
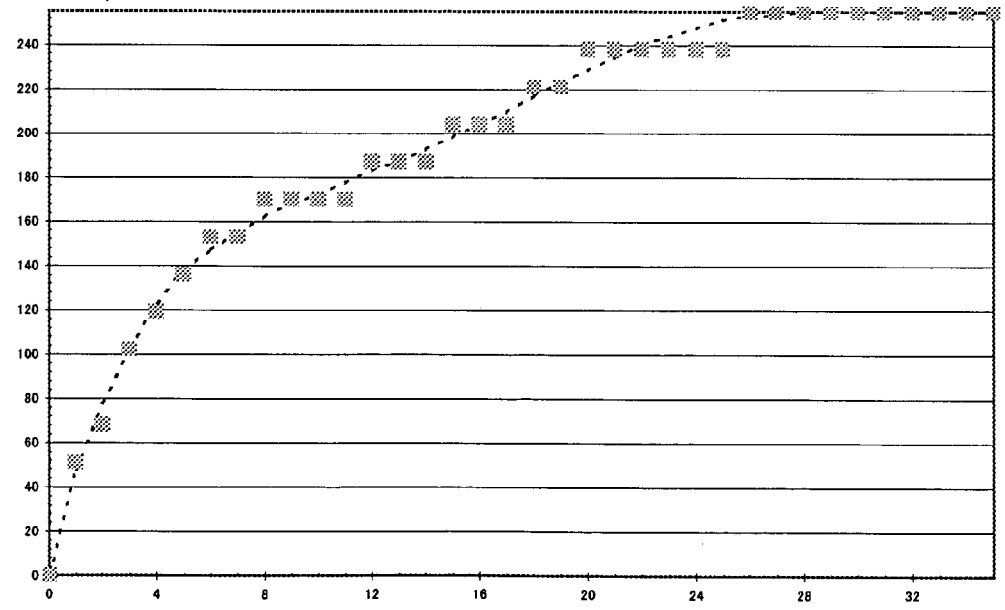
FIG. 14A-14C show the positioning of nine types of diffusion gamma tables in FIG. 12 and the table values.
Figure 14B:
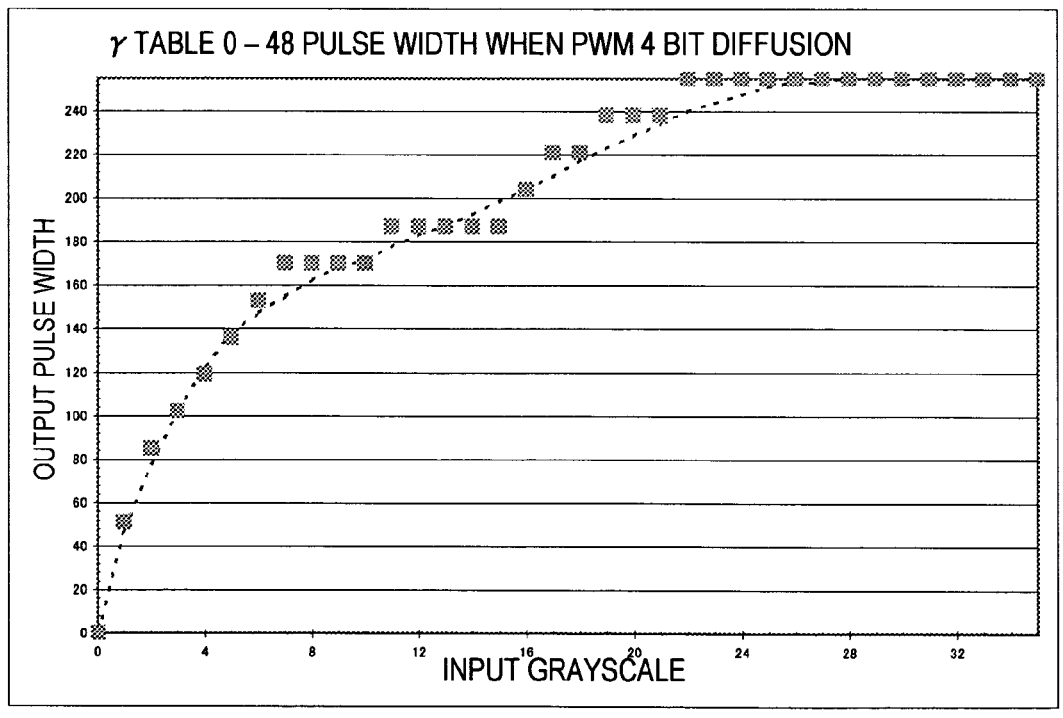
Figure 14C:
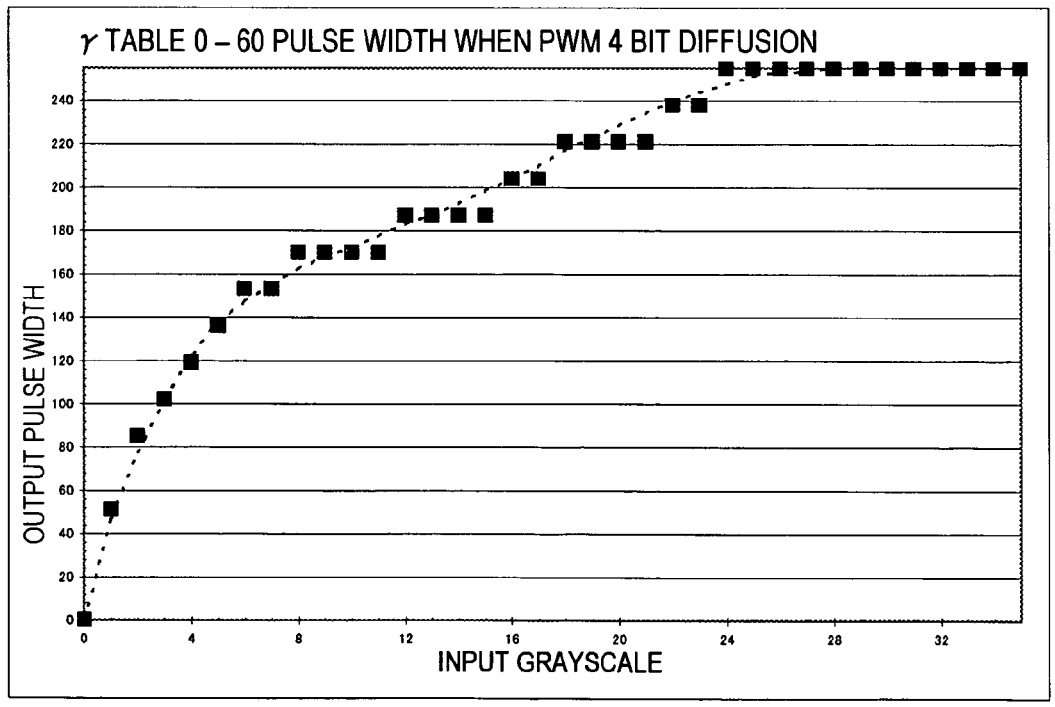
Figure 15A:
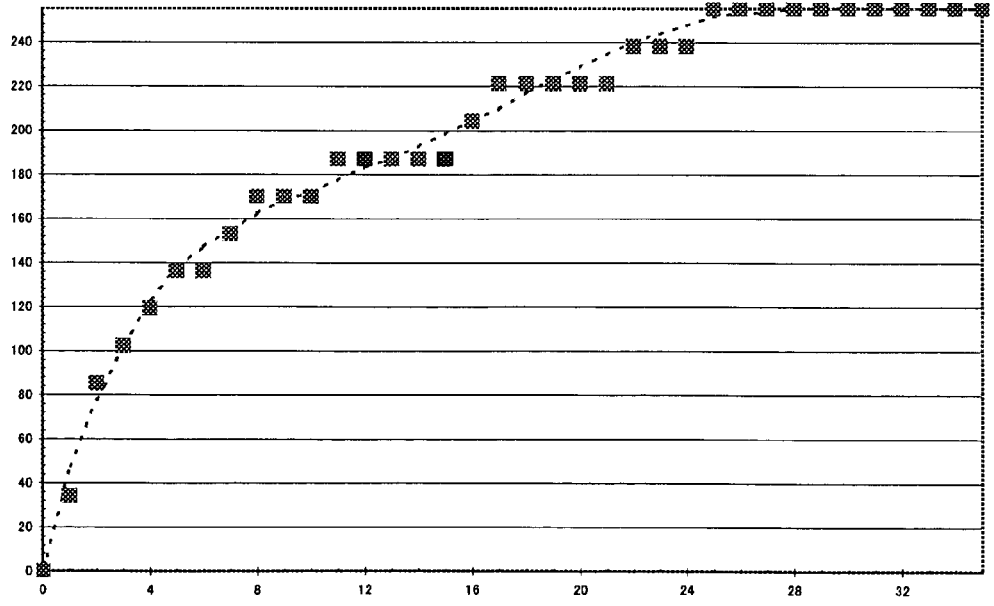
FIG. 15A-15C show the positioning of nine types of diffusion gamma tables in FIG. 12 and the table values.
Figure 15B:
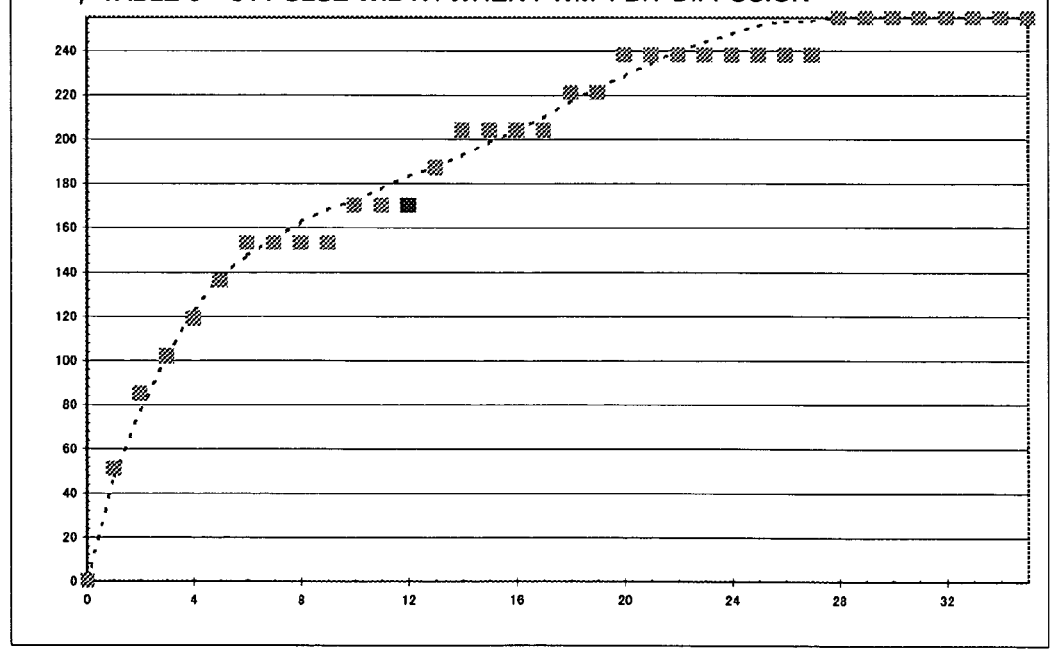
Figure 15C:
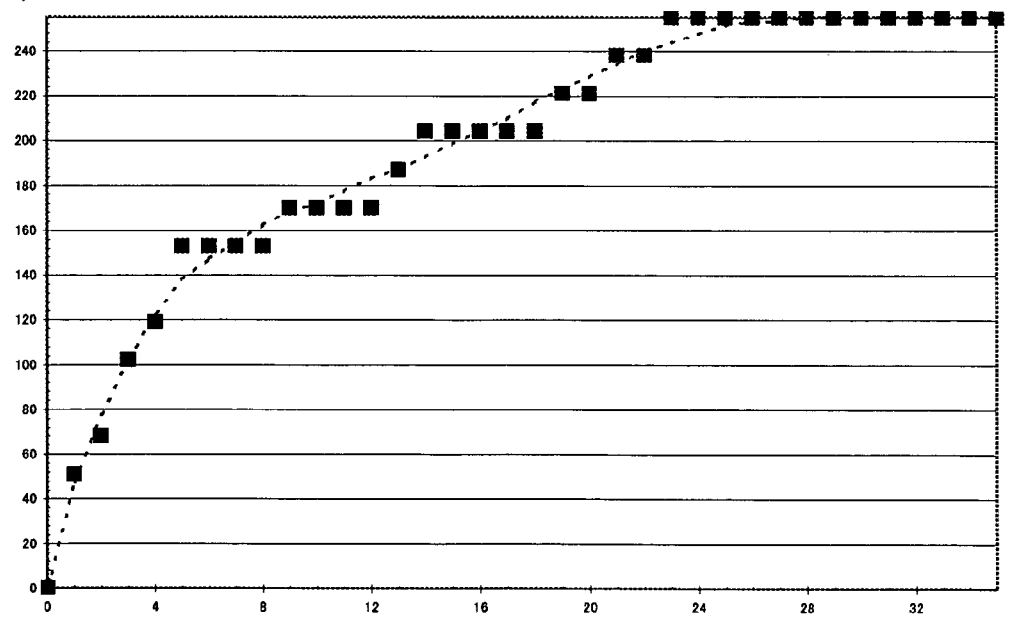

FIG. 13A-13C, FIG. 14A-14C and FIG. 15A-15C show the positions of the nine types of diffusion gamma tables in FIG. 12 and the specific table values. FIG. 13A-13C show the positions of the diffusion gamma tables 0, 12, and 24 in the index table and the table values, FIG. 14A-14C show the positions of the diffusion gamma tables 36, 48 and 60 in the index table and the table values, and FIG. 15A-15C show the positions of the diffusion gamma tables 72, 84 and 96 in the index table and the table values. The index numbers of the index table are small in font size and difficult to read, but are the same as FIG. 12. According to the index tables in FIG. 13-FIG. 15, the positions and the number of diffusion gamma tables which are diffused at random can be confirmed. The table value of the diffusion gamma table has a 4 bit discrete value, but in this example one of the discrete values, higher or lower, near the output value of the representative gamma table indicated by the broken line is assigned to each diffusion gamma table. Therefore by the diffusion gamma tables in FIG. 13-FIG. 15, it can be confirmed which discrete value, higher or lower, that each diffusion gamma table has in each input grayscale value from 0-25. In other words, just like the diffusion gamma table shown in FIG. 7, the nine types of diffusion gamma tables have discrete values close to the output value of the representative gamma table indicated by the broken line, as the output value, and by controlling the ratio of the assignment of the discrete value, the average value of the output values of the diffusion gamma table becomes extremely close to the output value of the representative gamma table.

As described above, the lookup table according to the present embodiment does not have a representative gamma table, but has a plurality of diffusion gamma tables instead of a representative gamma table. In a sense a virtual representative gamma table is assigned to the identical index pixel group, and the virtual representative gamma table has a plurality of diffusion gamma tables. And the average of the output values of the plurality of diffusion gamma tables becomes close to the output value of the representative gamma table.

Figure 16A:
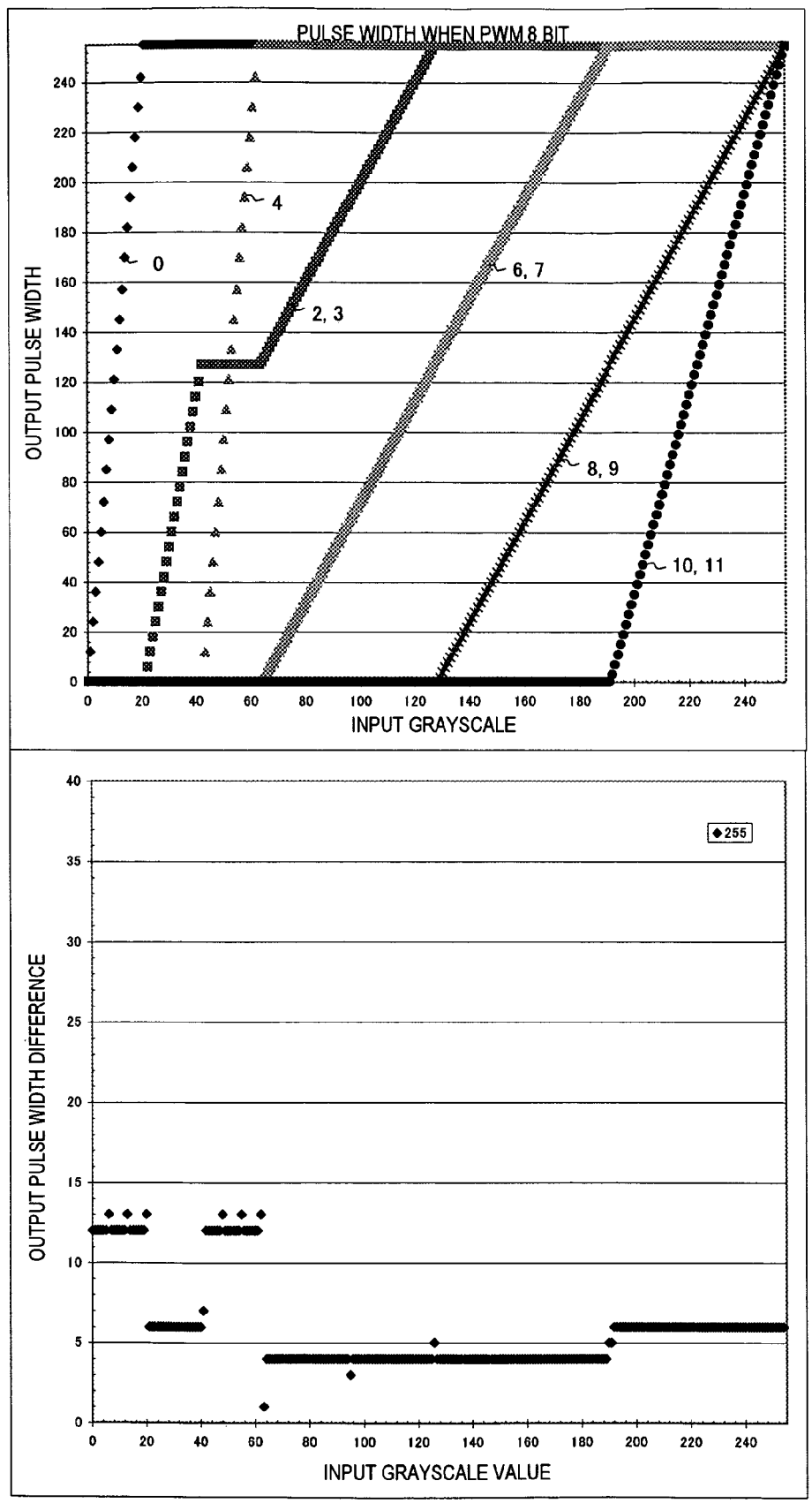
FIG. 16A-16C show the gamma tables in FIG. 11 and FIG. 12 and the output pulse width difference with respect to the change of the input grayscale value.
Figure 16B:
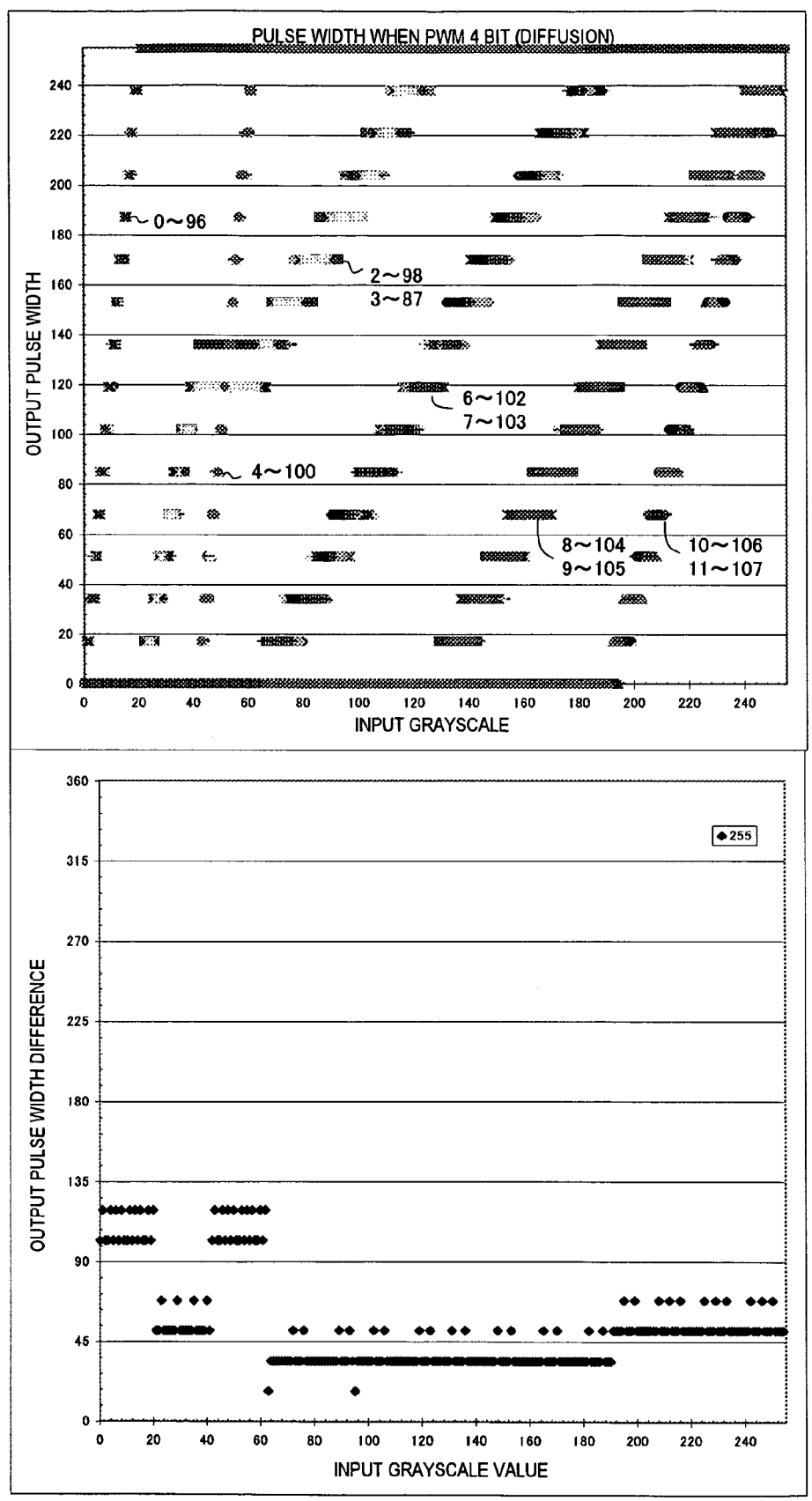
Figure 16C:
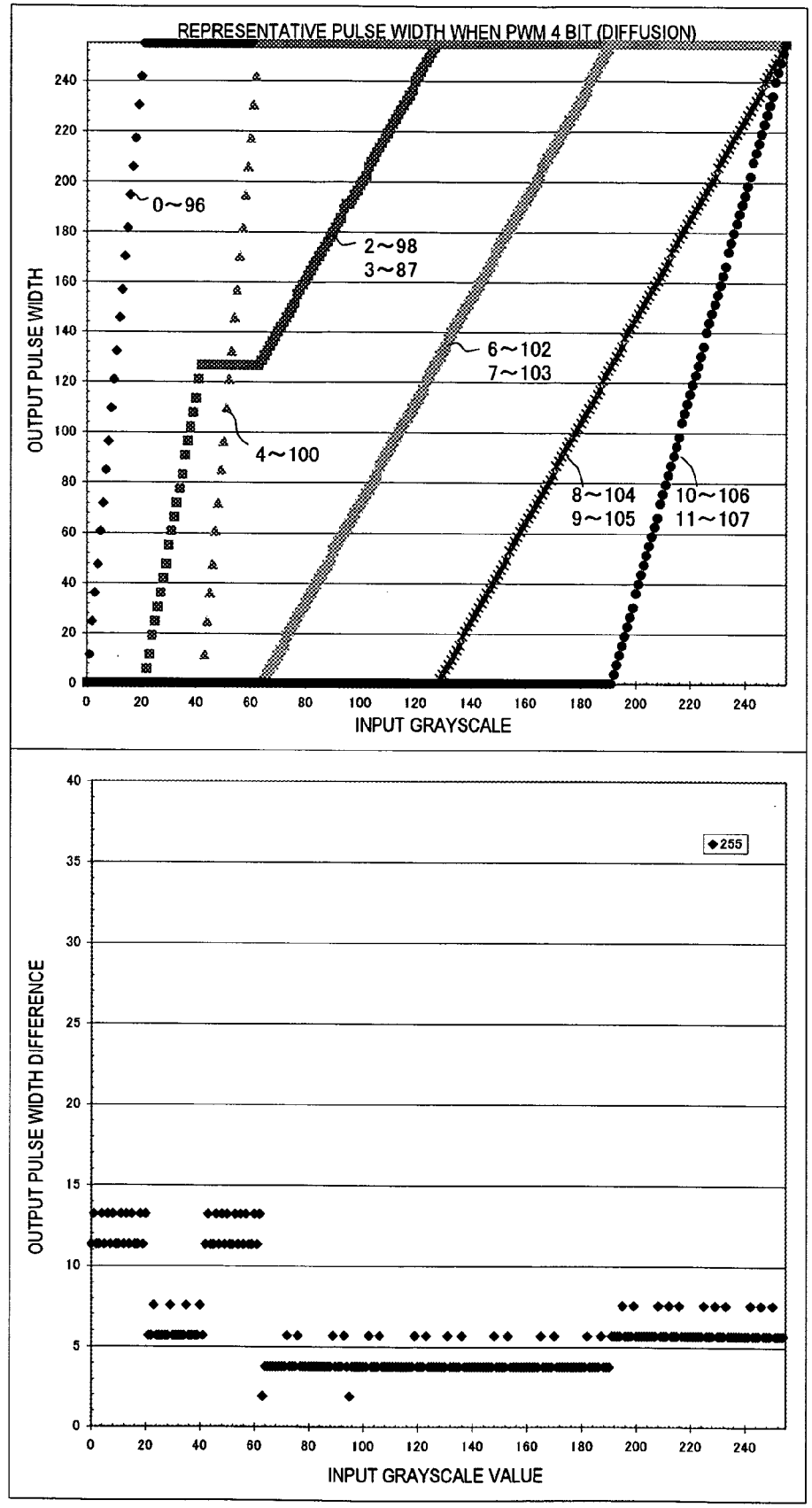

FIG. 16A-16C show the gamma tables in FIG. 11 and FIG. 12, and the difference of the output pulse width with respect to the change of the input grayscale value. FIG. 16A-16C are the same type as FIG. 4. FIG. 16A shows the representative gamma tables 0, 2, 3, 4, 6, 7, 8, 9, 10 and 11 shown in FIG. 11, and the difference of the total output pulse value with respect to the change of the input grayscale value. In other words, FIG. 16A is the same as FIG. 4A, and the total output pulse value changes for all the 255 times of the change of the input grayscale value.

FIG. 16B on the other hand, shows the diffusion gamma table shown in FIG. 12 and the difference of the total output pulse value with respect to the change of the input grayscale value. In other words, as the correspondence table 121B in FIG. 9 shows, the representative gamma table 0 is diffused to the diffusion gamma tables 0-96, the representative gamma tables 2 and 3 are diffused to the diffusion gamma tables 2-98 and 3-87, the representative gamma table 4 is diffused to the diffusion gamma table 4-100, the representative gamma tables 6 and 7 are diffused to the diffusion gamma tables 6-102 and 7-103, the representative gamma tables 8 and 9 are diffused to the diffusion gamma tables 8-104 and 9-105, and the representative gamma tables 10 and 11 are diffused to the diffusion gamma tables 10-106 and 11-107.

As FIG. 16B shows, even if the output value is a 4 bit discrete value, the average output value can be equivalent to the representative gamma table by diffusion or dispersing to a plurality of diffusion gamma tables. As a result, the total output pulse width difference changes at all 255 steps with respect to the change of the input grayscale value, and the tendency of the difference is the same as FIG. 16A. The scale on the ordinate however is 360 in FIG. 16B, nine times the 40 in FIG. 16A.

FIG. 16C shows a table converted into the average value of the nine types of diffusion gamma tables in FIG. 16B and the difference of the output pulse width with respect to the change of the input grayscale value in that case. If the average value is used, the gamma table is almost the same as the representative gamma table in FIG. 16A. The difference of the output pulse width is the same as FIG. 16B, where only the scale of the ordinate is different, and is the same scale as the ordinate in FIG. 16A with the same difference as FIG. 16A. As FIG. 16C shows, by diffusing or dispersing each representative gamma table to a plurality of diffusion gamma tables, an output value extremely close to the representative gamma table can be reproduced even if the number of bits is low and the number of output grayscales is small (see gamma table), and a high grayscale characteristics of 255 can be implemented even if the number of bits is low and the number of output grayscales is small (see the output pulse width difference). Therefore even if the half tone processing unit converts the data into image regeneration output data with a lower number of bits, high precision density characteristics and high grayscale characteristics equivalent to the output data with high bits can be implemented.

[Variant Form]

In the above embodiment, the representative gamma table is diffused or dispersed to the plurality of diffusion gamma tables when 8 bit input grayscale data is converted into 4 bit output pulse width data. In other words, while the output of the representative gamma table is 8 bits and 256 grayscales, the output of the diffusion gamma table is lower, that is 4 bits and 16 grayscales. Even in such a case, high grayscale characteristics and high precision density characteristics are implemented by diffusion or dispersing it to a plurality of diffusion gamma tables. The present embodiment is not limited to this, and even in the case of when 8 bit input grayscale data is converted into 8 bit output pulse width data using a diffusion gamma table, image quality can be improved by diffusing or dispersing each representative gamma table to a plurality of diffusion gamma tables having the same 8 bit output data. In this case, a high grayscale output density which cannot be represented by an 8 bit representative gamma table can be represented. In other words, an 8 bit representative gamma table can represent only 256 grayscales, but grayscale characteristics exceeding 256 grayscales can be provided to the output data by diffusing or dispersing it to a plurality of diffusion gamma tables. However one representative gamma table must be replaced with a plurality of diffusion gamma tables, which increases the memory capacity of the gamma table. In such a case, an increase in the entire memory capacity can be suppressed by disposing a plurality of diffusion gamma tables having only the difference value expressed by a small number of bits, in addition to a common representative gamma table, for example. For another example, the half tone processing unit may provide the difference value at random to the output data of the representative gamma table, and outputs it as the output data of the diffusion gamma table.

In the block diagram of the image processing in FIG. 1, the half tone processing unit 110 refers to the lookup table 122, and outputs the image regeneration output data OUT and L/R. However such conversion processing can also be executed by software processing using a microprocessor. In this case, the processor refers to a high-speed memory storing the lookup table 122 based on the input grayscale data IN and the pixel position information (X, Y), and generates the image regeneration output data OUT and L/R from the input grayscale data IN.

What is claimed is:

1. An image processor for generating image regeneration output data from grayscale input data, comprising:
    a halftone processing unit which converts said grayscale input data into said image regeneration output data corresponding to a dot size of pixels; and
    a lookup table to be referred to by said halftone processing unit, including a plurality of gamma tables storing image regeneration output data corresponding to said grayscale input data, corresponding to the position of the pixels of grayscale input data,
    wherein, in said lookup table, virtual representative gamma tables are respectively allocated to identical index pixel groups, each identical index pixel group being disposed on predetermined displacement vectors,
    wherein, for each virtual representative gamma table allocated to a corresponding identical index pixel group, a plurality of diffusion gamma tables are dispersed on the predetermined displacement vectors of the corresponding identical index pixel group, and
    wherein said plurality of diffusion gamma tables have the image regeneration output data near an output grayscale value of said virtual representative gamma table determined according to the grayscale input data.

2. The image processor according to claim 1, wherein said plurality of diffusion gamma tables is randomly dispersed within the corresponding identical index pixel group.

3. The image processor according to claim 1, wherein said plurality of diffusion gamma tables randomly have the image regeneration output data near the output grayscale value of said virtual representative gamma table according to said grayscale input data.

4. An image processor for generating image regeneration output data from grayscale input data, comprising:
    a halftone processing unit which converts said grayscale input data into said image regeneration output data corresponding to a dot size of pixels; and
    a lookup table to be referred to by said halftone processing unit, including a plurality of gamma tables storing image regeneration output data corresponding to said grayscale input data, corresponding to the position of the pixels of grayscale input data, wherein
    in said lookup table, a plurality of diffusion gamma tables which are dispersed on a plane within an identical index pixel group disposed on a predetermined displacement vector are assigned to each of said identical index pixel group, and said plurality of diffusion gamma tables have discrete image regeneration output data which is different at least partially corresponding to said grayscale input data, and an average value of the image regeneration output data of said plurality of diffusion gamma tables approximately matches an output grayscale value of a virtual representative gamma table of said identical index pixel group.

5. The image processor according to claim 1 or claim 4, wherein the output grayscale value of said representative gamma table has N bits and 2N grayscales, and the image regeneration output data of said diffusion gamma table has M bits (M<N) and 2M grayscales.

6. An image processing method for generating image regeneration output data corresponding to the dot size of pixels from grayscale input data, comprising,
    a halftone processing of converting said grayscale input data into said image regeneration output data by referring to a lookup table which has a plurality of gamma tables storing image regeneration output data corresponding to said grayscale input data, corresponding to the position of the pixels of grayscale input data,
    wherein, in said lookup table, virtual representative gamma tables are respectively allocated to identical index pixel groups, each identical index pixel group being disposed on predetermined displacement vectors, wherein, for each virtual representative gamma table allocated to a corresponding identical index pixel group, a plurality of diffusion gamma tables are dispersed on the predetermined displacement vectors of the corresponding identical index pixel group, and wherein said plurality of diffusion gamma tables have the image regeneration output data near an output grayscale value of said virtual representative gamma table determined according to said grayscale input data.

7. An image processing method for generating image regeneration output data corresponding to the dot size of pixels from grayscale input data, comprising, a halftone processing of converting said grayscale input data into said image regeneration output data by referring to a lookup table which has a plurality of gamma tables storing image regeneration output data corresponding to said grayscale input data, corresponding to the position of the pixels of grayscale input data, wherein in said lookup table, a plurality of diffusion gamma tables which are dispersed on a plane within an identical index pixel group disposed on a predetermined displacement vector are assigned to each of said identical index pixel group, and said plurality of diffusion gamma tables have discrete image regeneration output data which is different at least partially corresponding to said grayscale input data, and an average value of the image regeneration output data of said plurality of diffusion gamma tables approximately matches an output grayscale value of a virtual representative gamma table of said identical index pixel group.

8. A computer readable medium having stored thereon an image processing program for generating image regeneration output data corresponding to the dot size of pixels from grayscale input data, the program causing a computer to execute a half tone processing of converting said grayscale input data into said image regeneration output data by referring to a lookup table which has a plurality of gamma tables storing image regeneration output data corresponding to said grayscale input data, corresponding to the position of the pixels of grayscale input data, wherein in said lookup table, virtual representative gamma tables are respectively assigned to identical index pixel groups, each identical index pixel group being disposed on predetermined displacement vectors, wherein, for each representative gamma table allocated to a corresponding index pixel group, a plurality of diffusion gamma tables are dispersed on the predetermined displacement vectors of the corresponding identical index pixel group, and said plurality of diffusion gamma tables have the image regeneration output data near the output grayscale value of said virtual representative gamma table determined according to said grayscale input data.

9. A computer readable medium having stored thereon an image processing program for generating image regeneration output data corresponding to the dot size of pixels from grayscale input data, the program causing a computer to execute a half tone processing of converting said grayscale input data into said image regeneration output data by referring to a lookup table which has a plurality of gamma tables storing image regeneration output data corresponding to said grayscale input data, corresponding to the position of the pixels of grayscale input data, wherein in said lookup table, a plurality of diffusion gamma tables which are dispersed on a plane within an identical index pixel group disposed on a predetermined displacement vector are assigned to each of said identical index pixel group, and said plurality of diffusion gamma tables have discrete image regeneration output data which is different at least partially corresponding to said grayscale input data, and an average value of the image generation output data of said plurality of diffusion gamma tables approximately matches an output grayscale value of a virtual representative gamma table of said identical index pixel group.

* * * * *